(12) United States Patent
Pinkerton et al.

(10) Patent No.: US 7,526,577 B2
(45) Date of Patent: Apr. 28, 2009

(54) MULTIPLE OFFLOAD OF NETWORK STATE OBJECTS WITH SUPPORT FOR FAILOVER EVENTS

(75) Inventors: James T. Pinkerton, Sammamish, WA (US); Sanjay N. Kaniyar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 861 days.

(21) Appl. No.: 10/666,086

(22) Filed: Sep. 19, 2003

(65) Prior Publication Data
US 2005/0066060 A1 Mar. 24, 2005

(51) Int. Cl.
*G06F 15/16* (2006.01)

(52) U.S. Cl. .................. 709/249; 709/202; 709/228; 709/230; 709/238; 709/243; 370/229; 370/230; 370/231; 370/232

(58) Field of Classification Search .......... 709/238, 709/230, 247, 249, 227, 228, 243; 79/202; 370/229, 230, 231, 232; 710/15, 316
See application file for complete search history.

(56) References Cited

U.S. PATENT DOCUMENTS

| | | | | |
|---|---|---|---|---|
| 5,937,169 | A | | 8/1999 | Connery et al. .......... 395/200.8 |
| 6,141,705 | A | | 10/2000 | Anand et al. ................. 710/15 |
| 6,334,153 | B2 | * | 12/2001 | Boucher et al. ............. 709/230 |
| 6,370,599 | B1 | * | 4/2002 | Anand et al. ................. 710/15 |
| 6,427,171 | B1 | * | 7/2002 | Craft et al. .................. 709/230 |
| 6,963,946 | B1 | * | 11/2005 | Dwork et al. ............... 710/310 |
| 2002/0062333 | A1 | | 5/2002 | Anand et al. ................ 709/105 |
| 2003/0158906 | A1 | | 8/2003 | Hayes ........................ 709/211 |
| 2003/0204631 | A1 | | 10/2003 | Pinkerton et al. |
| 2003/0204634 | A1 | | 10/2003 | Pinkerton et al. |

OTHER PUBLICATIONS

Wang, Yang, et al. "A Dynamic Assignment Problem in a Mobile System with Limited Bandwidth" Proceedings of the 36th Hawaii International Conference on System Sciences, IEEE 2002.

* cited by examiner

*Primary Examiner*—Yves Dalencourt
(74) *Attorney, Agent, or Firm*—Workman Nydegger

(57) ABSTRACT

The present invention provides mechanisms for transferring processor control of multiple network connections between two component devices of a computerized system, such as between a host CPU and a NIC. In one aspect of the invention, two or more network communications may each have a different state object in the upper layers of a network protocol stack, and have a common state object in the lower layers (e.g., the Framing Layer) of the network protocol stack. In part due to the commonalities in the lower software layer states, the invention provides for offloading processor control of multiple network communications at once, including long and short-lived connections. In addition, the invention can negotiate with an alternative peripheral device to offload the network communication to the alternative peripheral device in the event of a failover event, and provides a solution to incoming data packets destined for one or more VLANs.

39 Claims, 8 Drawing Sheets

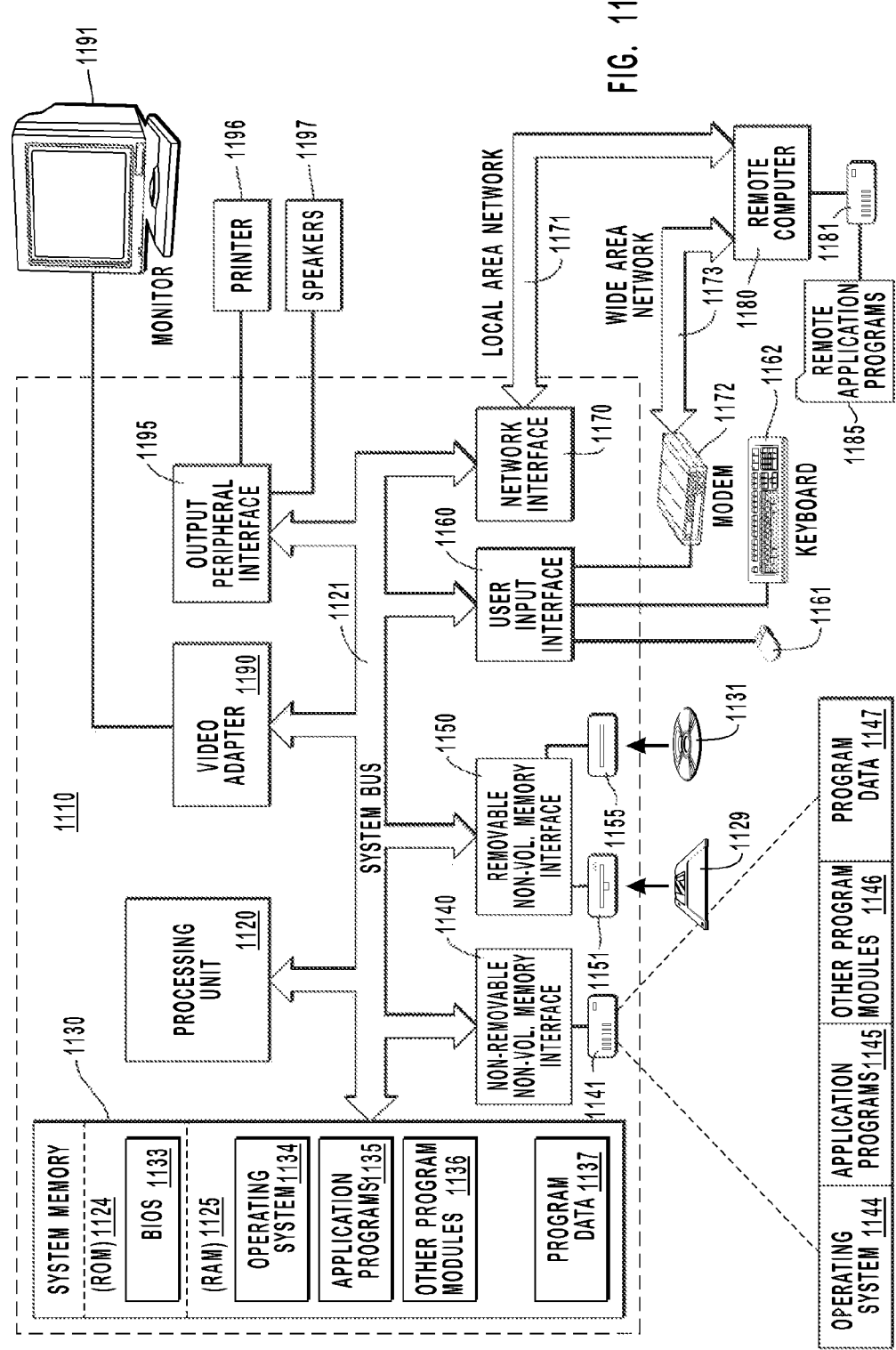

MULTIPLE OFFLOAD OF NETWORK STATE OBJECTS WITH SUPPORT FOR FAILOVER EVENTS

CROSS-REFERENCE TO RELATED APPLICATIONS

This application claims the benefit of U.S. Provisional Patent Application Ser. No. 60/502,156 entitled "Multiple Offload Of Network State Objects With Support For Failover Events," filed Sep. 10, 2003, the disclosures of which are incorporated herein by this reference.

BACKGROUND OF THE INVENTION

1. The Field of the Invention

The present invention relates generally to computer networking technology. More particularly, the present invention relates generally to mechanisms for optimizing the offload of network computing tasks.

2. Background and Relevant Art

The complexity and sophistication of operating systems, application software, networking technology, and the like continue to increase at dramatic rates, resulting in increased computer functionality. This increased functionality often results in increased Central Processor Unit (CPU) load (hereinafter also referred to as "CPU overhead") due to the additional duties that must be performed by the CPU to implement the increased functionality.

One area where the increase in CPU overhead is readily apparent is in the area of networked applications where network speeds are increasing due to the growth in high bandwidth media. Network speeds may even rival the CPU processor speed and access speeds for local memory at host computers. These networked applications further burden the host processor due to the layered architecture used by most operating systems, such as the seven-layer Open System Interconnect (OSI) model or the layered model used by the Windows operating system.

As is well known, such a model is used to describe the flow of data between the physical connection to the network and the end-user application. The most basic functions, such as putting data bits onto the network cable, are performed at the bottom layers, while functions attending to the details of applications are at the top layers. Essentially, the purpose of each layer is to provide services to the next higher layer, shielding the higher layer from the details of how services are actually implemented. The layers are abstracted in such a way that each layer believes it is communicating with the same layer on the other computer.

Various functions that are performed on a data packet as it proceeds between layers can be software intensive, and thus often require a substantial amount of CPU processor and memory resources. For instance, certain functions that are performed on the packet at various layers are extremely CPU intensive, such as packet checksum calculation and verification, encryption and decryption of data (e.g., SSL encryption and IP Security encryption), message digest calculation, TCP segmentation, TCP retransmission and acknowledgment (ACK) processing, packet filtering to guard against denial of service attacks, and User Datagram Protocol (UDP) packet fragmentation. As each of these functions is performed, the resulting demands on the CPU can greatly affect the throughput and performance of the overall computer system.

As the demand on CPU resources grows, the capability and throughput of computer hardware peripherals such as network interface cards (NICs) and the like are also increasing. These peripherals are often equipped with a dedicated processor and memory that are capable of performing many of the tasks and functions that are otherwise performed by the CPU.

The computer industry recognized this capability and developed methods to offload CPU intensive tasks and functions that were previously performed by the CPU. For example, commonly assigned U.S. Pat. No. 6,141,705 to Anand et al., U.S. Pat. No. 6,370,599 to Anand et al., and U.S. patent application Ser. No. 09/726,082, "Method and Computer Program Product for Offloading Processing Tasks from Software to Hardware," filed Nov. 29, 2000 provide solutions to query peripheral devices and offload specific processor tasks to the peripheral devices that are capable of performing the intensive tasks and functions. The specific tasks typically offloaded include tasks such as TCP (Transmission Control Protocol) and or IP (Internet Protocol) checksum computation, TCP segmentation such as Large Send Offload (LSO), and secure Internet protocol (IPSEC) encryption and decryption.

These offload mechanisms are limited in that the mechanisms have a secondary requirement that a minimum number of changes be made to the network stack. As a result of this secondary requirement, another limitation is that the offloads have a long code path because the entire network stack is traversed with the offloaded tasks and functions disabled to reach the peripheral device. A further limitation is the lack of integration with the network stack. There is no well defined interface for the network stack to query or set parameters on the peripheral device or an interface for the peripheral device to inform the network stack of any notifications or changes of capabilities. For example, if the route changes when an LSO request is being processed, the failback mechanism is for the stack to wait for timeouts and retransmit the LSO request.

Another approach that peripheral device manufacturers tried to take was to offload the entire TCP connection from the core stack to a Network Interface Card (NIC). This approach bypasses the entire protocol stack by using a proprietary interface and requires the peripheral device to handle TCP messages, IP (Internet Protocol) messages, ICMP (Internet Control Message Protocol) messages, DNS (Domain Name Server) messages, Dynamic Host Configuration Protocol (DHCP) messages, Routing Information Protocol (RIP) messages, etc. Additionally, this approach does not address multi-homed environments and does not cleanly integrate with the host operating system network management utilities. If a peripheral device state changes, the offloaded connection can easily fail. Such a potential for offload connection failure is only one of other disadvantages in the present art.

Note that a single "connection" typically consists of state for each of the network layers, referred to here as "state objects". Offloading of network protocol computation, however, is not limited to connection oriented protocols. Other protocols, such as IPSEC, may not be connection oriented but still contain state objects, or groups of state objects, which can be offloaded. Remote DMA (RDMA) may add additional state objects to those required for connection offload. This invention applies to all of the above, thus "state object" refers to one or more network layers which contain state, which may or may not be connection oriented, and may or may not contain more state than just that required for TCP/IP networking.

By way of explanation, and not of limitation, a "network connection" (sometimes herein referred to as a "connection") will be understood to be a "connection" using a protocol such as a TCP connection, a Stream Control Transmission Protocol (SCTP) connection (or stream), and, when it is used to implement connection-oriented communication, connection oriented User Datagram Protocol (UDP). Further, a "network connection" (or "connection"), while typically implemented at the transport layer (i.e. Layer 4) of the seven layer OSI network protocol stack model, could also occur at other layers, including Application Layer protocols that implement connections, or Data Link Layer protocols that implement connections.

Continuing, those developing offload mechanisms have focused on iteratively transferring only one connection at a time or one logical grouping of state objects at a time, particularly in the case of connections that need a relatively high number of CPU cycles for processing. For example, the total number of CPU cycles needed to process a single offloaded connection or state object can be expressed as:

A+[B−C], where

"A"=the number of CPU cycles needed to offload a connection or link;

"B"=the number of CPU cycles needed to process the connection or link; and

"C"=the number of CPU cycles saved by offloading the connection or link.

If the first term (i.e., "A"), is substantially greater than the second terms (i.e., "B−C"), then it is not generally cost effective in terms of CPU overhead to offload a given connection or link. By contrast, if the second term ("B−C") is substantially greater than the first term (i.e., "A"), then a benefit can be realized by offloading the connection or state object. Accordingly, offload mechanisms have been geared primarily toward offloading a connection or state object where the "B−C" term is relatively high. This is frequently the case for "long-lived" connections or connections used to transfer large files.

Long-lived connections, and connections or state objects for transmitting large amounts of data, however, are not the only types of connections or state objects that may require expenditure of a host computer's valuable CPU resources. For example, in the case of a host on a Wide Area Network (WAN) such as the Internet, a server hosting web pages may be equally consumed with processing hundreds of thousands of "short-lived" connections, such as thousands of simple web page requests.

Generally speaking, "short-lived" connections are, as implied by name, connections whose lifetime is short, such as HyperText Transfer Protocol (HTTP) connections where there may be one or more short data transfer requests and responses between a remote computer and a server (or host), often over a wide area network. HTTP version 1.0 illustrates this case. To request an ordinary text web page using HTTP 1.0, a client initiates a two-way connection with the server (or host) hosting the web page. The client's request of the server will be typically one message, a short ASCII string sequence such as "get file, file name" (e.g., "GET http://10.1.1.1/file_name.html"), the request comprising sometimes no more than a total data size of 100 bytes. After accepting the client's request, the client will close the first direction (client to server) of the two-way connection, and the server will respond by sending the text web page over the second direction (server to client) of the two-way connection, and then close the second direction of the two-way connection. There are many different protocols with this type of workload, including some that combine a small number of requests before closing the connection, rather than processing a single request. Each such protocol is referred to as a short-lived connection.

The HTTP web page request often comprises anywhere from 100 to 1,000 bytes. The HTTP response may also likewise be quite small if, for example, the requested web page is text-based and contains little, if any, multimedia information. Accordingly, neither the request nor the response carries a significant amount of data, especially when one considers the widespread availability of high-speed networks. Moreover, neither the request nor the response requires a significant amount of CPU time under present standards due to increasingly fast processors. Therefore, the connection time needed to process the HTTP request and response may be quite short-lived. In this case, the number of CPU cycles required to offload a single short-lived connection could easily be greater than the number of CPU cycles preserved by not having the CPU process the short-lived connection. Consequently, it is relatively expensive in terms of CPU cycles to iteratively offload one short-lived connection at a time.

Another constraint related to offloading network computation involves working with specifications that provide for creation of one or more virtual peripheral device(s) on top of one or more physical peripheral device(s). This is useful for several reasons, including aggregation of multiple network links to support load balancing of network traffic and failover of network traffic, as well as subdividing a single link into one or more virtual links, commonly referred to as a Virtual LAN (VLAN), which enables network management to view a physical network as multiple, logically distinct, networks.

Examples of technologies which provide link aggregation include IEEE 802.3ad (also referred to herein as "the 802.3ad standard"), as well as other vendor proprietary standards. In particular, the 802.3ad standard (as well as vendor proprietary standards) defines how two or more Ethernet links can be combined to support load balancing of network traffic or failover of network traffic across multiple Ethernet links. This capability can be used to a) increase the fault tolerance of the host to network link failures and/or b) to increase the networking capacity of the server by enabling networking traffic to be load balanced across multiple Ethernet links. To accomplish this end, the 802.3ad standard provides for a "team" of peripheral devices that can be "teamed" into one virtual peripheral device. The virtual peripheral device then manages the physical peripheral devices in the team by changing which of the peripheral devices in the team are currently enabled (for failover) and/or by directing network traffic across the multiple physical devices (for load balancing). For example, if the "team" is configured for failover and the virtual peripheral device detects that a physical peripheral device has failed, then the virtual peripheral device will no longer use the failed peripheral device and instead use another peripheral device in the team of peripheral devices to send and receive networking traffic.

Examples of Virtual LAN specifications include the IEEE 803.1q specification for VLAN tags. The specification defines a tag that is added to the Media Access Control (MAC) address, enabling the Ethernet network to be logically subdivided into separate networks by changing the tag value. This enables system administrators to logically separate traffic for different administrative domains (e.g. separate a network for engineering development from a network for payroll) while using the same physical network for both. It also allows for isolation for security concerns, such as logically isolating block storage network traffic from traditional peer-to-peer traffic.

There are several limitations when using current state of the art in network offload and attempting to combine them with the ability to create virtual peripheral devices. If the virtual peripheral device is used for load balancing or fault tolerance, and a connection or state object is offloaded through the virtual peripheral device to a physical peripheral device, and the physical peripheral device fails, typically the offloaded connection or state object can not be recovered (let alone failed over to another physical peripheral device). Additionally, current state of the art often requires the virtual peripheral device to be able to team heterogeneous physical devices. If physical peripheral devices support offloading of connections or state objects, then this means that the physical devices in the team have different offload capabilities. If a physical device fails and a new physical device within the team is selected by the virtual device, the new physical device may have a greater or lesser capacity for offload or different capabilities for offload than the prior device. Current state of the art for offloading of network computation does not enable this level of versatility.

Accordingly, there is a need in the art to reduce the overhead associated with offloading of multiple connections from a processor to a peripheral device, and vice versa, as well as a need to extend offload capabilities to cleanly integrate with existing specifications that enable the creation of one or more virtual peripheral device(s) on top of one or more physical peripheral device(s) to increase fault tolerance, network capacity, and network management in an offloaded environment. In particular, there is a need for solutions for offloading multiple short-lived connections while simultaneously maintaining specialized processing requirements for the individual connections. As well, there is a need for solutions for offloading or uploading aggregated connections within the 802.3ad environment (particularly as applied to peripheral device failover events) and a need to enable support for Virtual LANs.

BRIEF SUMMARY OF THE INVENTION

The present invention overcomes one or more of the foregoing problems with the prior state of the art by providing a method of reliably offloading and uploading multiple network connections or state objects between a host processor and a peripheral device processor. The present invention also provides for 802.3ad (or equivalent) failover events, allowing the offloaded connections or state objects to be transferred to another peripheral device while preserving object state between various connections, and compensating for differing resource capabilities among other peripheral devices. The inventive method is cost-effective in terms of CPU cycles for transferring either long-lived or short-lived connections (or both).

In one embodiment, the present invention reduces the term "A" in the above-described equation ("A+[B−C]") by enabling the offload of multiple connections at the same time, thus making the offload of short-lived connections viable, where previously only long-lived connections were typically viewed as viable for offloading to the peripheral device.

In a network stack, two or more TCP connections may traverse the same path through one or more intermediate software layers. Each of the software layers has a state object, which may include one or more of a constant state variable, a cached state variable, and a delegated state variable. For any software layer, the host offloads processing control to a peripheral device for a layer's delegated stated variables to enable the peripheral device to independently transfer data. For cached state variables, the host retains control of the cached state variables, and updates the peripheral device if the cached state variable changes. For constant state variables, their value does not change for the lifetime of the offload. Thus, though the host may offload the state object to a peripheral device, the state of the system remains consistent, even if events cause cached or delegated state variables to be changed.

The path data transfer takes between two hosts is represented by the path state object. If two connections transfer data through the same path, then they will share the same path state object. Thus there is a resulting hierarchy of state objects that takes the form of an inverted tree data structure. The host may offload the entire inverted tree data structure to the peripheral device, allowing the host to offload processing control to the peripheral device of multiple connections at once. This ability to cleanly offload multiple, specific network functions allows the host to preserve CPU cycles without compromising desired network functions, integrity, fault tolerance, and security, and further allows the present invention to be practiced in a wide variety of environments, including short and long lived connections.

The invention also includes integration of the offload functionality with a grouping of peripheral devices, referred to as a "team" or abstractly as a "virtual peripheral device", to enable better fault tolerance of peripheral or path faults, as well as enable load balancing of networking traffic across multiple peripheral devices. The invention includes a mechanism to allow the virtual peripheral device to stall offload requests while a failover event is occurring, and optionally upload all offloaded state objects, renegotiate the offload capabilities of the virtual peripheral device, and then re-enable offloading of state objects.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features in accordance with the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 11 is a suitable computing system that may implement features in accordance with the present invention.

DETAILED DESCRIPTION OF THE PREFERRED EMBODIMENTS

Figure 1:
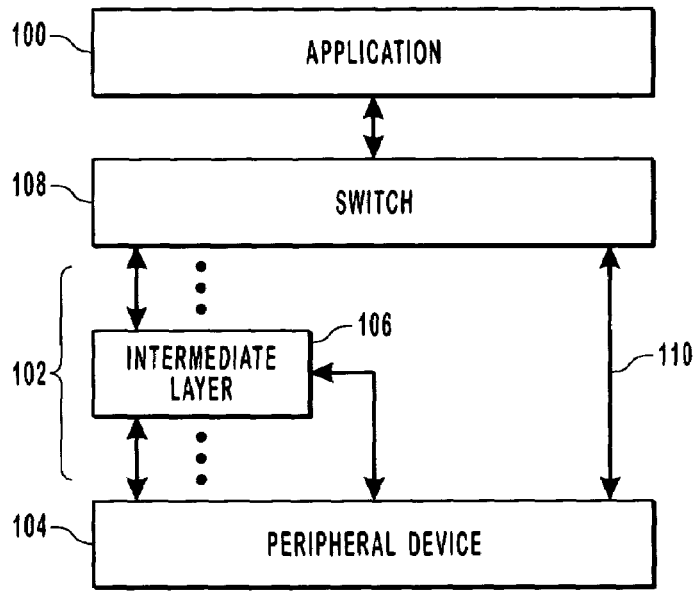
FIG. 1 is a block diagram illustrating the functional layers of the network stack and the alternate path in accordance with the present invention.

The present invention relates generally to computer networking technology. More particularly, the present invention relates generally to mechanisms for optimizing the offload of network computing tasks that are typically performed by a host processor to a specific hardware component, and for returning control to the host processor as appropriate. The present invention also increases the flexibility of the offloaded network computing tasks, through use of a virtual peripheral device. This flexibility can result in increasing fault tolerance of the offloaded network computing tasks as host load changes or network device state changes, as well as enabling support for virtual LANs.

Accordingly, the present invention contemplates transferring network connections from one peripheral device to another peripheral device, or from a peripheral device to a host processor while compensating for state changes among the various network connections, and compensating for differing resource capabilities among other peripheral devices. By way of explanation, and not of limitation, one will appreciate after reading the specification and claims that a "peripheral device" can include such components as a Network Interface Card, as well as a general purpose CPU with a network adapter, a network processing engine with a dedicated CPU, a traditional miniport with an offload NIC, or a hardware state machine implementation, etc. The following discussion, therefore, describes an inventive method that is cost-effective in terms of CPU cycles for transferring either long-lived or short-lived connections (or both) between components.

As will be discussed in greater detail, a host detects what resources a peripheral device may have, and adjusts the relevant data structures accordingly so that there is consistency between the relevant connections' requirements and the offload peripheral device. The ability to manipulate offload data structures has particular application to allow consistent upload and offload using a wide variety of network protocols, including inserting additional data structures within an offload or upload data structure as appropriate. Since the host maintains control over certain data structures even though the connection may be offloaded, and since the host may renegotiate parameters with a new peripheral device in the event of failover of an initial peripheral device, the present invention provides a novel, robust method of offloading and uploading multiple TCP connections at once, regardless of peripheral device failure, and whether the connection is a long or short-lived connection.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features in accordance with the present invention will become more fully apparent from the following description and appended claims, or may be learned by the practice of the invention as set forth hereinafter.

Embodiments within the scope in accordance with the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Turning now to FIG. 1, the figure illustrates the interrelationship of some of the components that make up a networking model in accordance with the present invention. During normal operation, networked messages are sent by the application 100 through network stack 102 to the peripheral device 104 where the messages are sent to other devices and applications on the network. Additionally, networked message may be received from the other devices and applications on the network using the peripheral device 104, which then passes the networked messages through the network stack 102 to the application 100. The network stack 102 includes one or more intermediate software layers 106. Data sent from application 100 travels through the intermediate software layer(s) 106 where specific operations may be performed on the data such as packaging the data, reliable data transmission, data encryption and calculation of a message digest.

The switch 108 is used to offload network stack operations for the intermediate software layer(s) 106 from a host's processing unit. While the switch 108 is shown separately, it should be noted that the switch 108 may be integrated into the top intermediate layer of the network stack 102. After offloading the network stack operations, data is sent to the peripheral device 104 via chimney 110 to enable peripheral device 104 to perform network stack operations. In this hierarchy, the intermediate software layers do not have to exclusively reside in the host or the peripheral device. Furthermore, the hierarchy allows any of the intermediate layers to either be completely offloaded, to remain in the host, or a combination of both (e.g., offload one or more specific connections). Additionally, chimneys may be layered on top of chimneys (e.g., an IPSEC chimney may be layered on top of a TCP chimney).

A connection may be any combination of reliable and unreliable data transfers, and may include unicast or multicast data transfer. In any case, when the state object(s) for a given connection are offloaded, and there are cached variables in the state object, the intermediate layer guarantees that if the variable designated as "cached" for a respective state object is changed within the host, the cached copy of the variable is updated in the peripheral device. For example, offloading a connection may include offloading a transport control block (TCB) state entry for the Transport Layer with a Route Cache Entry (RCE) for the Network Layer, with an Address Resolution Protocol Entry (ARP) for the Framing Layer, all offloaded to the peripheral device 104. The switch 108 continues to send traffic for a different TCB through the host network stack 102 that shares the same RCE while the switch 108 sends traffic through the chimney 110 for the offloaded TCB.

The switch 108 initiates the offload by sending the intermediate layer 106 an offload request. Each intermediate layer 106 either refuses the offload request or adds resource information to the offload request and sends the offload request to the adjacent software layer in the network stack 102. The offload request includes resource information (potentially for each network layer) that helps the peripheral device 104 decide whether it can successfully offload the connection. When the peripheral device 104 receives the offload request, it calculates whether it has resources available to offload the connection. The peripheral device 104 refuses the offload request if the offload is not possible. Otherwise, the peripheral device 104 accepts the offload request and allocates resources for the connection. The peripheral device 104 completes the offload request by sending a completion message having a list of parameters to the intermediate software layer(s) 106. The list of parameters provides information to the intermediate software layer(s) 106 and switch 108 to allow the intermediate software layer(s) 106 and switch 108 to communicate with the peripheral device. As each intermediate software layer 106 receives the completion message, it removes information for its layer from the list of parameters and passes the remainder of the completion message to the next intermediate layer 106, or if there are no additional intermediate layers 106, to the switch 108.

Either when an intermediate layer 106 receives the completion message for offloading or during the original offload request, the intermediate layer 106 passes its state to the peripheral device 104. Each state may have three types of variables (also referred to as "state variables"): CONST, CACHED, and DELEGATED. A state object corresponding to any given intermediate layer 106 may have all three types of states, or a subset of the three types of states. CONST state variables are constants that never change during the life of the offloaded connection.

The CONST state variables are provided to the peripheral device 104 when offloading processing control of the network stack (hereinafter also referred to simply as "during offload"), but are not returned by the peripheral device 104 back to the appropriate intermediate layer 106 when the state object is uploaded to the host protocol stack (hereinafter also referred to as simply "during upload"). This is because the intermediate layer 106 retains the values for the CONST state variables, thus allowing the data structure passed during upload to be much smaller.

The host processor maintains ownership of CACHED state variables and ensures that any changes to a CACHED state variable(s) in the host processor are updated in the peripheral device 104. Control messages that change the CACHED state variables are handled by the network stack 102. As a result, the host will write CACHED state variables to the peripheral device during offload, but during upload it does not need to read CACHED state variables back from the peripheral device during upload. This further reduces the overhead associated with an upload.

The host processor transfers ownership of DELEGATED state variables to the peripheral device 104. The DELEGATED state variables are written once during offload and are read back during upload. By only transferring back control of the DELEGATED state variables, the overhead associated with uploading the connection back to the host is minimized.

Accordingly, during offload, control of state objects is shared between the host processor and the peripheral device 104 in that control of some of the state variables of a given state object is retained within the host processor, while control of other state variables of the given state object are passed to the peripheral device 104. Therefore, control for processing of state associated with each intermediate layer is cleanly divided between the host processor and the peripheral device such that each owns an exclusive portion of the state.

The host processor can query the peripheral device 104 for DELEGATED state variables when needed. The host processor may also query CONST or CACHED state variables for diagnostics. Dividing the state into three categories (or "variables") enables the network stack 102 to coexist cleanly with the chimney 110. Any state variables that are to be given to the peripheral device (whether or not control over such state variables is also passed to the peripheral device) may be included in the initial offload request to optimize the number of interactions between the peripheral device and host stack. This can be done if either the state object does not contain a delegated state or the host stack can ensure that the delegated state variables will not change between the initial offload request and the completion of the offload request.

An upload can be directly initiated by either the peripheral device 104 or the switch 108. The upload can also be indirectly initiated by an intermediate layer 102 because, for example, the intermediate layer 102 invalidated a path or neighbor entry. Once the upload is initiated, the peripheral device 104 completes all outstanding requests and hands the state objects back to the host stack. The switch 108 queues any further transmit requests and stops posting receive buffers to the peripheral device 104. During the upload the intermediate layers of the host stack regain control of the state object(s), and finish the upload request. After the upload request has completed, the peripheral device 104 then frees resources that are no longer being used due to the upload.

Under some situations, data for a specific connection or state object may arrive through another peripheral device or may be required to be processed by the host protocol stack (for example, IP fragments or route flaps which cause a TCP segment to arrive on a different network interface). If this occurs, an intermediate layer 106 may also have a forwarding interface to forward the received data to the peripheral device 104. An intermediate layer 106 may attempt to forward data to the peripheral device 104 while the peripheral device is in the middle of uploading the associated connection or state object. Thus the peripheral device 104 may no longer have control of the state object necessary to process the data packets. If this occurs, the peripheral device 104 returns an error message to the intermediate layer 106 indicating an upload is in progress. The error message informs the intermediate layer 106 to stop forwarding incoming data and to buffer further data until the intermediate layer receives the state object.

Alternatively, at the expense of additional buffer memory on the peripheral device 104, the incoming data could be forwarded to the peripheral device 104 for the peripheral device 104 to buffer the data and provide the data when the uploading of the state object has completed. (FIG. 7 describes the upload process in greater detail).

Figure 2:
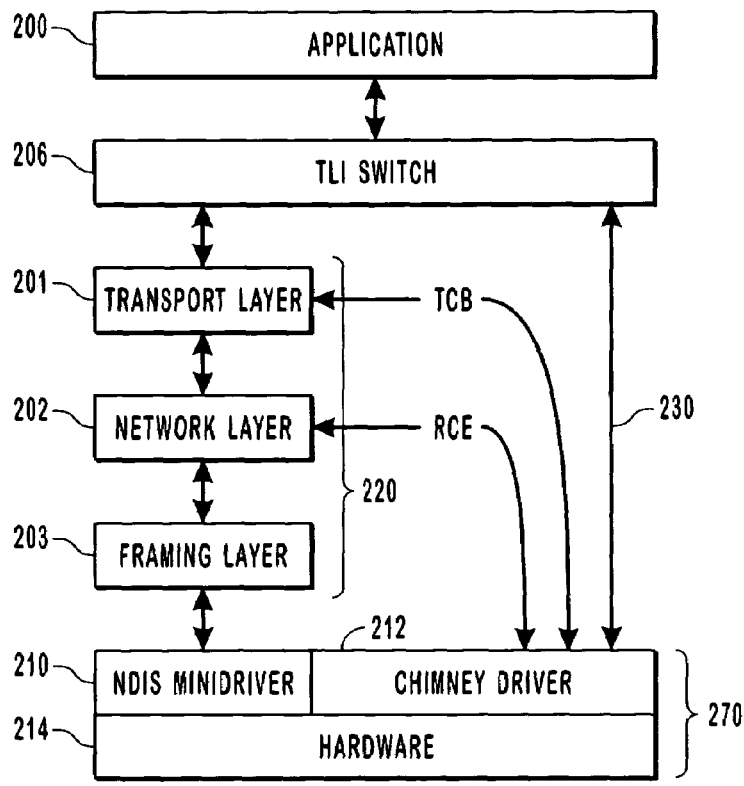
FIG. 2 is a block diagram illustrating the functional layers of the NDIS path and the bypass path in accordance with the present invention.

Multiple connections may be off-loaded by an intermediate software layer 106 to the peripheral device 104. A reference counter is maintained by the intermediate software layer 106 of the number of upper layer state objects (i.e., state objects of layers above the intermediate software layer 106) which reference the intermediate software layer's state object for offload. A state object as used herein is a collection of state variables (also referred to as "states") for a particular layer. As previously mentioned, such state variables may be categorized as CONST, CACHED, or DELEGATED. If the number of references to a specific intermediate layer's offloaded state object is decremented to zero (for example, during an upload request), the intermediate layer 106 sends a message to the peripheral device 104 to upload the state object for the intermediate layer, send corresponding delegated state variables to the intermediate layer 106 and delete the state object for the intermediate layer 106. Note that the upload request may occur during the original upload request that caused the reference count to be decremented to zero, or at a later time FIG. 2 describes an embodiment in accordance with the present invention where the hardware layer 214 includes a peripheral device that may be, for example, a Network Interface Card (NIC). In addition, FIG. 2 illustrates a software layer that includes a switch 206 (i.e., Transport Layer Interface (TLI) switch 206), and a network stack 220 that comprises a Transport Layer 201, a Network Layer 202, and a Framing Layer 203. The Network Layer 202 is also known as a "Path Layer" and the Framing Layer 203 is also known as a "Neighbor Layer".

In general, an application 200 sends networked messages through network stack 220 to the peripheral device (e.g., hardware 214) during operation. Data sent from the application 200 travels through the TLI switch 206, which controls whether the data goes down the host based network stack 220 or the chimney 230. Note that the TLI switch 206 may be incorporated into the top layer of the network stack 220. The software layers in the network stack 220 receive data from the application 200, package the data in a packet form, and send the resulting packets to the peripheral device hardware 214 via NDIS minidriver 210. The software layer also provides the opposite functionality when a network packet is received as it hands the payload to the application. Other tasks the network stack 220 may perform as a data packet passes through the stack 220 includes data encryption and decryption, reliable data transmission, and calculation or checking of a message digest (e.g., checksum or CRC for the data packet). Many of these tasks are performed by the host processor if not offloaded and are processor intensive.

The TLI switch 206 is used to offload stack operations from the CPU to the peripheral device by sending data for offloaded connections to the peripheral device via chimney 230 and chimney driver 212. One skilled in the art will appreciate after reading the specification and claims that the NDIS driver 210 and the chimney driver 212 may be the same actual driver. Those skilled in the art will also recognize that the upper edge of NDIS minidriver 210 and chimney driver 212 is the NDIS API in the MICROSOFT® WINDOWS® operating systems. For purposes of explanation, a Transmission Control Protocol (TCP) based protocol stack will be used to explain the invention. However, one of ordinary skill in the art will appreciate after having reviewed this description that many types of peripheral devices may be used and other network stacks may be offloaded using the principles in accordance with the present invention. For example, stream control transmission protocol (SCTP) or user datagram protocol (UDP) based protocol stacks, Remote DMA (RMDA), or IPSEC encryption/decryption may be offloaded. Additionally, the invention may also be used to offload higher function protocols such as the internet Small Computer System Interface (iSCSI), the Network File System (NFS), or the Common Interface File System (CIFS). The offloaded protocol may be connection-oriented (e.g., TCP) or connectionless (e.g., IPSEC).

There are many reasons for performing a network connection offload. By way of example, and not limitation, some of the reasons are provided below. A system administrator could select a specific service to be offloaded. A specific connection may be offloaded if traffic (in terms of number of bytes or packets) is consuming a significant amount of resources. In addition, certain types of services may be offloaded such as IPSEC services. In addition, administrative policies may drive processing offloads. For example, an administrator may have a policy that all connections from within an organization are offloaded first or all connections for a specific application are offloaded first. System resources (e.g., CPU utilization, data cache use, page table cache use, memory bandwidth) being used may lead the host processor to offload connections.

Figure 3:
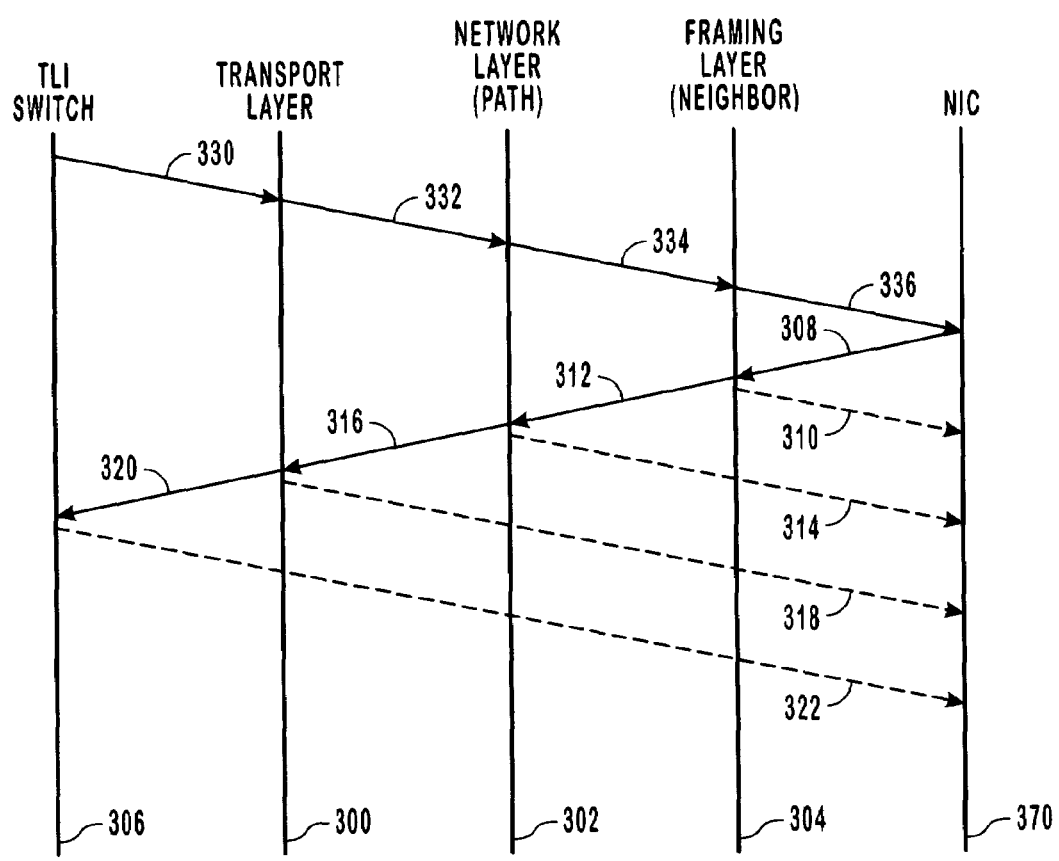
FIG. 3 is a ladder diagram illustrating the offload mechanism in accordance with the present invention.

FIG. 3 illustrates a three step process taken to offload a TCP connection, where the application layer 200 in FIG. 2 is not shown, but would be to the left of TLI switch 306. In addition, the peripheral device 370 is shown in FIG. 3 as a NIC simply for purposes of illustration, though other types of peripheral devices could perform the same or similar function in accordance with the present invention, including a general purpose CPU with a network adaptor. In general, FIG. 3 illustrates that the process allocates resources required to offload the TCP connection, provide handles to each of the layers 300, 302, 304, 306 and offloads the state for each of the layers 300, 302, 304, 306 to the peripheral device 370. During the offload transition, the TLI switch 306 buffers all messages sent from the application. Alternatively, the Transport Layer 300 buffers the data. When the offload is complete, the buffered data is transferred to the peripheral device 370. When incoming packets are received during the offload transition, the peripheral device 370 continues to move the data up through the layers 300, 302, 304, 306 until the Transport Layer delegated state is handed to the peripheral device 370. If the Transport Layer 300 received incoming packets during the offload transition, it will forward the data to the NIC 370 as part of the transport state object delegated state or separately.

The TLI switch 306 initiates the offload by sending the Transport Layer 300 an offload request 330. The offload request includes a pointer to the next layer's local state (e.g., a TCB pointer for Transport Layer 300, an RCE pointer for Network Layer 302, an ARP entry pointer for the Framing Layer 304 or an NDIS miniport pointer for the NDIS minidriver 210). The offload request also includes the offload type (e.g., TCP for TLI switch 306, IPv6 for Network Layer 302, and so forth), and resource information that helps the peripheral device 370 decide whether it can successfully offload the TCP connection. The TLI switch 306 may also provide an offload handle to the peripheral device 370. The TLI switch 306 will stop sending application send or receive buffers to the Transport Layer 300 and will queue them and wait for the Transport Layer 300 to send a completion message 320.

The Transport Layer 300 either refuses the offload request or sends an offload request 332 to Network Layer 302 with TCP resource information added to the TLI switch resource information. The Transport Layer 300 may also provide an offload handle to the peripheral device 370. If there are any outstanding application send or receive buffers pending, the Transport Layer 300 returns the buffers to the TLI switch 306.

The Network Layer 302 receives the offload request 332 and either refuses to offload the connection or sends an offload request 334 to the Framing Layer 304 with network resource requirements added to the TCP resource information and the TLI switch resource information. The Network Layer 302 may also provide an offload handle to the peripheral device 370.

The Framing Layer 304 either refuses to offload the connection or sends an offload request 336 to the peripheral device 370 with framing resource requirements added to the network resource requirements, the TCP resource information and the TLI switch resource information. The Framing Layer 304 may also provide an offload handle to the peripheral device 370.

The peripheral device 370 receives the offload request and calculates whether it has resources available to offload the TCP connection. If the NIC decides the offload is not possible, it refuses the offload request. If the NIC decides the offload is possible, it accepts the offload request and allocates resources (e.g., TCB, route cache entry (RCE), address resolution protocol (ARP) table entry (ATE)) for the connection. The peripheral device 370 creates a linked list of parameters and dispatch tables to hand to the layers 300, 302, 304 and 306 and completes the offload request by sending a completion message 308 having the linked list of parameters to the Framing Layer 304. The parameters include an offload handle and dispatch table for each of the layers 300, 302, 304,306.

As used herein, an offload handle means a mechanism to allow a software layer to communicate with the peripheral device or a peripheral device to communicate with a software layer. By way of example and not limitation, an offload handle may be a pointer-based handle, an integer value used as a lookup into an array, a hash table (e.g., a hashing function), a communication channel between the software layer (or network stack) and the peripheral device, or a set of parameters passed down by a software layer that the peripheral device uses to look up the state object.

By way of example and not limitation, the mechanism to communicate between the intermediate software layers (306, 300, 302, and 304) and the peripheral device 370, referred to as a dispatch table, can be a function call pointer, used as a lookup into an array, a hash table (e.g., a hashing function), a communication channel between the software layer (or network stack) and the peripheral device, or a set of parameters passed down by a software layer that the peripheral device uses to look up the state object. The dispatch table could be exchanged during peripheral device initialization or at a later time.

The dispatch tables are used to send data directly to the peripheral device 370 or receive data directly from the peripheral device 370. The dispatch tables can also be used to provide diagnostics. For example, a software layer could be inserted between two intermediate layers or between the bottom most intermediate layer and the peripheral device to monitor the system and inject faults to make sure the system is functioning properly. Additionally, the dispatch table can be patched by software layers that can add additional functionality if needed. For example, a software layer could be added to provide the functionality of a filter driver or a virtual peripheral device. Patching is typically done by overwriting the dispatch table with function pointers for the inserted intermediate layer. Then when the function pointer for the inserted intermediate layer is called and the inserted intermediate layer has finished its work, the inserted intermediate layer calls the original function pointer from the original dispatch table.

When the Framing Layer 304 receives the completion message, the Framing Layer 304 stores the offload handle and dispatch table for the Framing Layer in its ARP Table Entry for easy updates (e.g. the destination MAC address changes or the encapsulation type changes). The Framing Layer 304 then updates 310 the peripheral device 370 with the state associated with the ATE. The Framing Layer 304 removes its state from the linked list and forwards 312 the remaining information in the linked list to the Network Layer 302.

The Network Layer 302 stores the offload handle and dispatch table for the Network Layer 302. The Network Layer 302 then updates 314 the peripheral device 370 with the state associated with the RCE. The Network Layer 302 removes Network Layer information from the linked list and sends a completion message 316 having the linked list of parameters and dispatch tables to the Transport Layer 300. The Network Layer 302 may forward any buffered IP fragments it received during the offload to the peripheral device 370 for processing or it may process the IP fragments in the Network Layer and forward them to the Transport Layer 300.

The Transport Layer 300 stores the offload handle for the Transport Layer and sends 318 its state to the peripheral device 370. In alternate embodiment, the Transport Layer and the TLI switch are the same layer. The Transport Layer then sends 320 the completion message.

In an alternate embodiment, the layer's state object is sent with the offload request. For example, the Framing Layer state object, Network Layer state object, and Transport Layer state object is sent with the offload request, and only updated if the cached state changes between the offload request and the completion event. The entire layer state object can only be sent with the offload request if the delegated state is either not present or cannot change between the offload request and the completion of the offload request. If a message is received that would change DELEGATED state during the offload sequence, that message will not generally be processed (should be buffered), and when the offload completes, the message must be forwarded to the offload peripheral device for processing. However, state variables classified as CACHED may be sent with the offload request and may change between the offload request and the completion of the offload request. If this occurs, changes in the CACHED state change must be recorded, and when the offload completes, the CACHED state must be updated in the peripheral device.

Once the TLI switch 306 receives the completion message 320, the TLI switch 306 transfers 322 the application send and receive buffers to the peripheral device 370. The TLI switch 306 uses the dispatch table to post all outstanding and future receive buffers and sends to the NIC 370 for processing. During the time the offload request takes to complete, each layer 300, 302, and 304 either refuses new offload requests for the offloaded state object (i.e., the state object associated with a layer) or queues them until the offload is complete. In an alternate embodiment, the application buffers are handed down in the initial offload request.

The Transport Layer 300 may still have the ability to process incoming TCP data and hand the TCP payload to the TLI switch 306 if the transport state object was not offloaded to the peripheral device 370 in the initial offload request 332. If incoming TCP data arrives through the network stack 302 after this time, the incoming data is forwarded to the peripheral device 370 to be processed by the peripheral device.

On subsequent offload requests, the Network Layer 302 and the Framing Layer 304 pass the offload handles they received from the peripheral device 370 from the prior offload to the peripheral device 370. This signals to the peripheral device 370 that the peripheral device 370 has already allocated resources for the Network Layer 302 and Framing Layer 304, which conserves peripheral device 370 resources and speeds up the offload.

As indicated previously, the layers 300, 302, 304 pass their state to the peripheral device 370. Each state has three types of state variables: CONST, CACHED, and DELEGATED. CONST state variables are, as implied by name, constants that never change during the life of the offloaded connection. Thus, the host will not need to read CONST state variables back to the layers when the connection is terminated. Similarly, the host processor maintains ownership of CACHED state variables and ensures that any changes to a CACHED variable in the host processor are updated in the peripheral device 370. As a result, the host will write but never read back the CACHED state variables (unless system diagnostics requests it). The host CPU, therefore, transfers ownership only of DELEGATED state variables to the peripheral device 370. The DELEGATED state variables are written one time when the offload occurs, and are read back when the offload is terminated. Since the peripheral device (e.g., NIC) only needs to transfer back the DELEGATED state variables, the overhead of transferring the connection back to the host is minimized. Furthermore, the host CPU queries the peripheral device 370 for DELEGATED state variables only when needed (e.g., for statistics).

The CONST state variables for the Transport Layer 300 can include the destination port, the source port, one or more flags to control transport layer behavior (e.g. whether window scaling is enabled or SACK is enabled), SEND and RECV window scale factors, and the initial maximum segment size advertised by the remote endpoint (Remote MSS). As already described herein, the value of each such aforementioned TCP CONST variable is constant—its value does not change during the life of a TCP connection.

The CACHED state variables for the Transport Layer 300 can be TCP state variables and IP state variables. IP state variables may be required in the transport structure if the implementation enables the network layer values to be overwritten on a per connection basis. These CACHED state variables can include one or more flags (e.g. whether the "Nagle" algorithm, or whether TCP "Keep-Alives" are enabled) as well as the "Keep-Alive" settings (i.e., interval, number of probes, and delta), Effective Maximum Segment Size (or Effective MSS), initial default receive window (InitialRcvWnd), the number of bytes to be copied in the receive indicate by the peripheral device 370, Type of Service (TOS) that prioritizes packets according to traffic types for IPv4, and finally traffic class and flow label to enable IPv6 packets to be prioritized in the network.

The DELEGATED state variables can include current TCP state as specified in the Internet Engineering Task Force (IETF) RFC 793, one or more flags (e.g. was the connection abortively closed by the remote peer), a sequence number for the next expected TCP receive segment (i.e., RCV.NEXT), receive window size (RCV.WND), the sequence number for the first Un-Acknowledged Data (SND.UNA), the sequence number for next TCP segment to be sent (SND.NEXT), the send window size (SND.WND), the segment sequence number used for the last window update (SndWL1), the segment acknowledgement number used for the last window update (SndWL2), the maximum sequence number ever sent (SND.MAX), the Maximum Send Window (MAX_WIN), and the current Congestion Window (CWnd).

The DELEGATED state variables can further include, a Slow Start Threshold (SSTHRESH), the smoothed round trip time (SRTT), the round-trip time variation (RttVar), the timestamp value to send in the next TCP ACK (TsRecent), how long ago the most recent timestamp was received (TsRecentAge), how many ACKs have been accepted for the same sequence number (DupAckCont), the number of keepalive probes that have been sent (KeepAlive ProbeCount), the time remaining until the next keepalive timeout (KeepAlive TimeoutDelta), the number of retransmits that have been sent (KeepAlive Count), the time remaining until the next retransmit timeout (Retransmit TimeoutDelta), and a pointer to buffered receive data (BufferedData—TCP data that was received while the offload or upload was in progress).

The CONST state variables for the Network Layer 302 may include the destination IP address (for either IPv4 or IPv6) and the source IP address (for either IPv4 or IPv6). The CACHED state variables for the Network Layer 302 may include the path maximum transmission unit (PathMTU). The DELEGATED state variables for the Network Layer 302 may include the IP Packet ID start value. The CACHED state variables for the Framing Layer 304 may include the destination Media Access Control (MAC) address, parameters for IETF RFC 2461 Neighbor Discovery (Host reachability delta and NIC reachability delta) and a flag to indicate the format of the header (e.g., LLC/SNAP (Logical Link Control/Sub-Network Access Protocol) format or DIX (Digital, Intel, Xerox) format).

The Transport Layer state may includes a handle for the Network Layer state object and the Network Layer state may includes a handle for the FramingLayer state object because the Network Layer (also referred to as "Path") state can be shared between multiple connections and the Framing Layer (also referred to as "Neighbor") state can be shared between multiple paths (e.g., all traffic going through one router). This hierarchy is maintained for several reasons. A connection may require a NIC handle for the Network Layer because the IP ID namespace may be managed across all offloaded connections on a per path basis or because an update of the Path MTU can be done once at the Network Layer and effect all TCP connections, rather than individually setting it for each TCP connection. A path requires a NIC handle for the Framing Layer state object because a route update could change the next hop address, thus pointing to a new MAC address. The hierarchy also condenses the amount of state required to be maintained by the NIC. For example, an ARP update for IPv4 could change the mapping from an IP address to a MAC address (e.g., an interface failed over on the server). The host maintains the MAC address as a cached variable, thus it only needs to do a single update of the cached state and all connections are failed over to the new interface.

Once the host has offloaded a TCP connection, the peripheral device 370 is responsible for assigning packet identifiers (e.g., IP IDs) for the packets it sends using IPv4. IP ID is offloaded on either a per interface basis or a per layer state object basis. In either case, the peripheral device 370 is assigned a portion of the IP ID namespace. In one embodiment, the peripheral device 370 is assigned half of the total IP ID namespace when it is initialized, and the host protocol stack maintains its portion of the IP_ID namespace on a per peripheral device basis. Another embodiment enables the host protocol stack to maintain the IP_ID namespace on a per path basis. The peripheral device is given an IP packet ID start value to use when the network state object is passed to the peripheral device 370. The peripheral device 370 uses the following formula to generate an IP ID on IP packets it sends:

$$Cur\_IPID=[(Start\_IPID\_For\_This\_Path)+(Counter\_For\_This\_Path)mod32K]mod64K$$
$$Counter\_For\_This\_Path=Counter\_For\_This\_Path+1$$

When the offloaded connection is either uploaded or invalidated, the peripheral device 370 transfers the next IPID value it would use to the Network Layer to store for the next offload that occurs and the host processing unit 320 continues to use the portion of the IP ID namespace it was assigned. The host processing unit 320 could use the full IP ID name space, but preferably only after the maximum lifetime of the IP packets on the network has been exceeded.

The peripheral device 370 places data into receive buffers in the order the data is received and fills application buffers in the order they are posted for the offloaded connection. Many applications wait for a receive indication before posting a receive buffer. In one embodiment, the peripheral device 370 has a global pool of buffers to use if data arrives for a connection and no application receive buffers have been posted. The global pool of buffers is used across the offloaded connections and may be used to implement: 1) handling of out-of-order TCP transmissions; 2) de-fragmenting IP datagrams; 3) a buffer copy algorithm rather than a zero copy algorithm if the application is posting buffers that are too small for a zero copy algorithm; and 4) an indicate mechanism to indicate data to the application when the application has not preposted buffers. Alternatively, a per-connection pool of buffers may be used if efficient use of buffer resources is not a concern. In this case, the global pool of buffers is only used if the application did not pre-post buffers or for lack of system resources (e.g., not enough resources to pin the application buffer in memory).

Figure 4A:
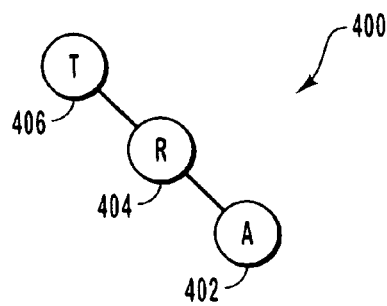
FIGS. 4A-4D are object diagrams illustrating an inverted tree in accordance with the present invention with respect to intermediate software layer state in objects.

Turning now to FIGS. 4A-4D, a typical peripheral device (e.g., a NIC) that has received an offload may have an inverted tree data structure 400, which is representative of the offload. In the figures, dotted lines represent new states allocated by the peripheral device. In FIG. 4A, the peripheral device has an ARP entry 402 coupled to a route cache entry 404 that is coupled to a network connection as a TCP entry 406. If, for example, all network connection (e.g., TCP) traffic is going to a router, the next hop will always be to the same ARP entry 402. If the route cache entry 404 is to be used for the next network connection offload, the only new resource is the new offloaded TCP state object. Thus when the host CPU initiates an offload down the network protocol stack, the intermediate software layers that have already offloaded their state (e.g. Network Layer 302 and Framing Layer 304) would simply insert the peripheral device generated offload handle that was allocated on the previous offload request. The peripheral device 170 only has to allocate new resources (e.g. TCP entry 408) and send offload handles for the new resources back up the network protocol stack.

Figure 4B:
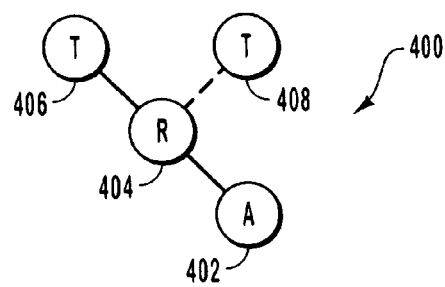

The inverted tree 400 now has TCP entry 408 coupled to the route cache entry 404 (see FIG. 4b). This approach saves peripheral device resources and speeds up the offload. Additionally, if a cached variable state changes, only a single structure needs to be updated. If all state for the various software layers in the chimney were offloaded as a single entry, any state update below the top software layer would require multiple updates.

Figure 4C:
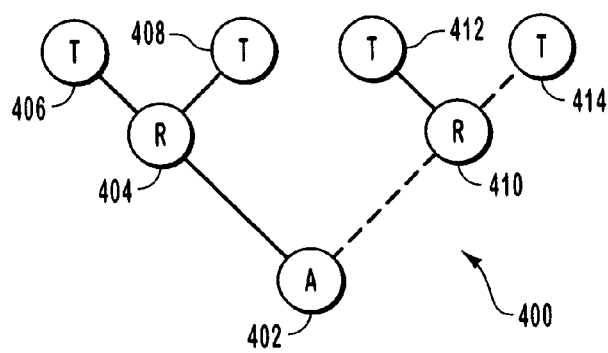
Figure 4D:
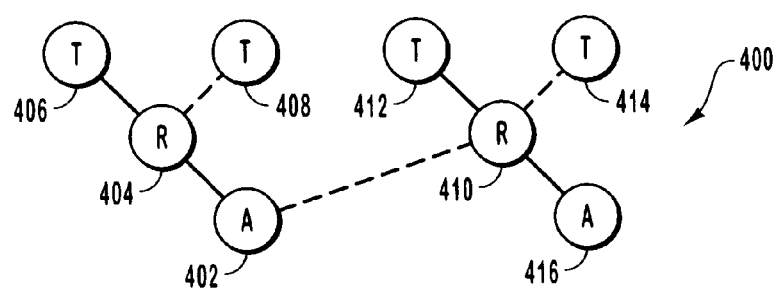

FIG. 4C shows the inverted tree 400 with a more complex configuration. There are two route cache entries, 404 and 410, that go through ARP table entry 402. TCP network connections 406 and 408 utilize route cache entry 404. TCP network connections 412 and 414 reference route cache entry 410. If any ARP update occurs (e.g., a multi-homed server's interface fails over using a gratuitous ARP update), only entry 402 must be updated. This enables potentially thousands or hundreds of thousands of connections to be failed-over to a new interface with only a single update to the peripheral device required. FIG. 4D shows two independent inverted trees (entries 402-408 and entries 410-416) merged into a single inverted tree 400 after a route update occurs. Before the route update, the next hop ARP entry for route cache entry 410 is ARP table entry 416. After the route update, the next hop ARP table entry is ARP table entry 402. Thus, the use of an inverted tree enables route updates to be processed as a single transaction to the peripheral device, rather than thousands or tens of thousands of updates if the state for the framing layer, network layer, and transport layer were offloaded as a single entry. Importantly, the inverted tree concept can be extended to offload multiple connections at a time.

Figure 5A:
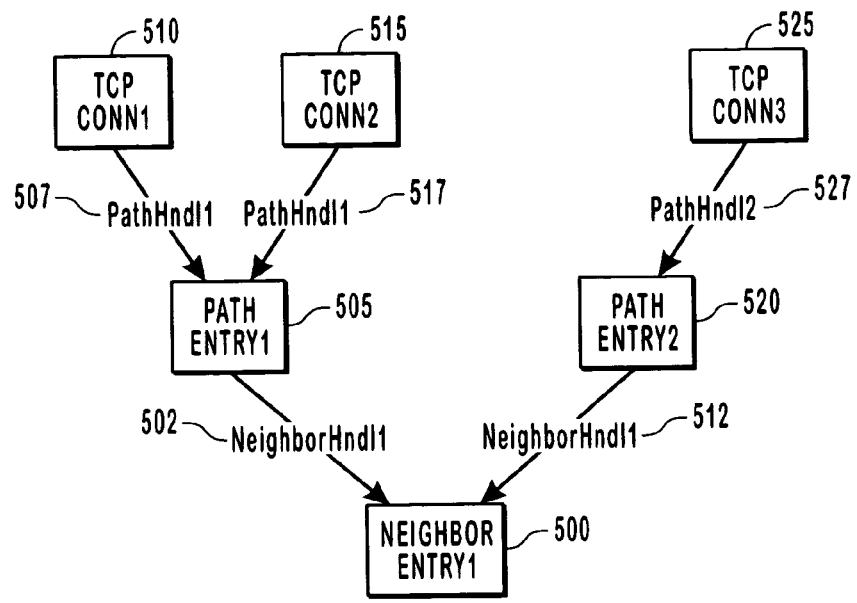
FIGS. 5A-5B are block diagrams illustrating an inverted tree in accordance with the present invention with respect to a collection of block pointers.
Figure 5B:
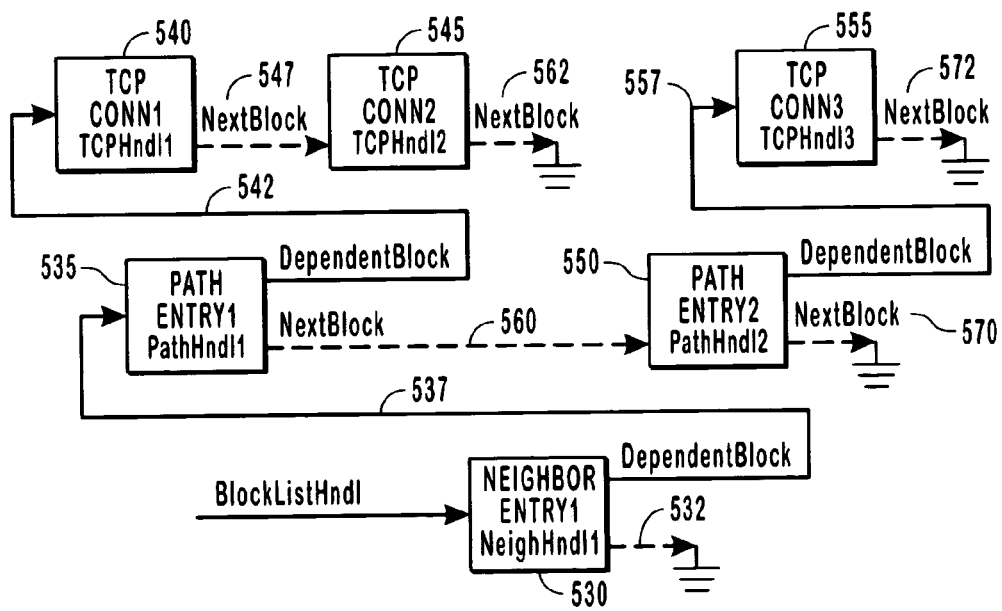

FIGS. 5A and 5B illustrate an additional feature in accordance with the present invention with specific reference to a block list handle (or "block list"). In general, a block list is a data structure that is given to an Offload Target (e.g., a peripheral device) during Chimney Offload or Chimney Termination. Thus, the component that is processing a network connection sends the block list back to the host in the case of "upload", and down to the peripheral device in the case of "offload" so that the initial point of reference is arbitrary. The block list data structure comprises a series of pointers that point to specific next layer state object (Dependent Block) or to state objects at the same layer (Next Block).

More particularly, a Dependent Block pointer points to the next level up in the hierarchy and is used to inform the Offload Target of any existing dependencies between intermediate software layers in the network protocol stack. For example, a Neighbor (or Framing Layer) state object will be dependent on a Path (or Network Layer) state object, which may be dependent on the TCP connection of the same hierarchy. A Next Block pointer, however, points to a data structure that is at the same level in a different hierarchy. For example, a Path (or Network Layer) state object in a first TCP connection may point to a Path state object in a different TCP connection.

FIG. 5A illustrates an inverted tree data structure, as similarly shown in FIGS. 4A-4D. The inverted tree of FIG. 5A shows two TCP connections 510 and 515 (i.e., TCP Conn1 and TCP Conn2) that have different TCP layer state entries, but a common Path (or Network Layer) state entry 505, and common Neighbor state entry 500. A different network connection 525 (i.e., TCP Conn3), however, has a separate Path state entry 520, but a common neighbor state entry 500. The entire sequence hierarchy can be defined between each software layer by a series of path handles that direct the connection to the next software layer. For example, path handles 507 and 517 direct TCP state entries 510 and 515 respectively to Path state entry 505, which in turn has a handle 502 directing it to Neighbor state entry 500. Similarly, TCP state entry 525 has a handle 527 that points to a Path state entry 520, which in turn is directed to common Neighbor state entry 500 via handle 512. In accordance with the present invention, FIG. 5A can also be expressed in terms of Next block pointers, to thereby include multiple network connection chimneys at once.

FIG. 5B illustrates how the block list handle (collection of various Next and Dependent block pointers) relates several network connection blocks among different network connections for simultaneous offload. As in FIG. 5A, FIG. 5B denotes the inverted tree in terms of software layer blocks that include the various software state handles. Shown are TCP blocks 540 and 545 with a common Path block 535, and a common Neighbor block 530. A third TCP block 555 has a Path block 550 and the same Neighbor block 530. The block list handle would state that Neighbor block 530 include a Dependent Block pointer 537 that points to Path block 535. In contrast with the prior inverted tree of FIG. 5A, however, the Neighbor block 530 may also point to another inverted tree data structure through Next Block pointer 532. If the Next Block pointer 532 is missing (e.g., a NULL value), this may signal in the block list that there are no other inverted trees at that layer of the inverted tree. Similarly, Path block 535 has a Next Block pointer 560 that points to Path block 550, an entirely different connection "branch" of the inverted tree.

As in the case of the Neighbor block 530, both Path blocks 535 and 550 each have Dependent block pointers 542 and 557 respectively, and a Next Block pointer 560 and 570 respectively, such that Path block 550 may also point to a different connection Path of an entirely different inverted tree (e.g. 572). In addition, each of the TCP blocks 540, 545, and 555 have Next Block Pointers 547, 562 and 572 that may point to another TCP block in the same inverted tree (e.g., 547), or may indicate that there are no more blocks in the tree (e.g. 562 and 572). These pointers are not, however, static. That is, the links may change such as if a route for a path changes, it may change the next neighbor to a different route. In that case, for example, Path block 550 might change the neighbor state entry it uses from Neighbor Entry 1 530 to some other neighbor, (e.g. Neighbor Entry 2 (not shown)). Accordingly, the use of a block list enables multiple connections, paths, and neighbor entries to be offloaded or terminated in a single program call.

By way only of example and not of limitation, a first offload request might require the Offload Target (e.g., a NIC) to allocate state and a handle for each of the data structures (e.g., 540, 545, 535, 530, etc.), and return the Offload Target's handle to the host network protocol stack. If the Offload Target allocated handle in a specific entry is invalid, the state object is a new offload request. Subsequent offload requests by the host stack might reuse existing Path or Neighbor state entries. The block list may contain just one state object for each layer (for example, a single Neighbor state object, Path state object, and a TCP state object), or it may be the more complex structure defined in FIGS. 5A-5B. This more complex structure, as noted, enables multiple connections, Paths, and Neighbor entries to be offloaded or terminated in a single program call.

Figure 6:
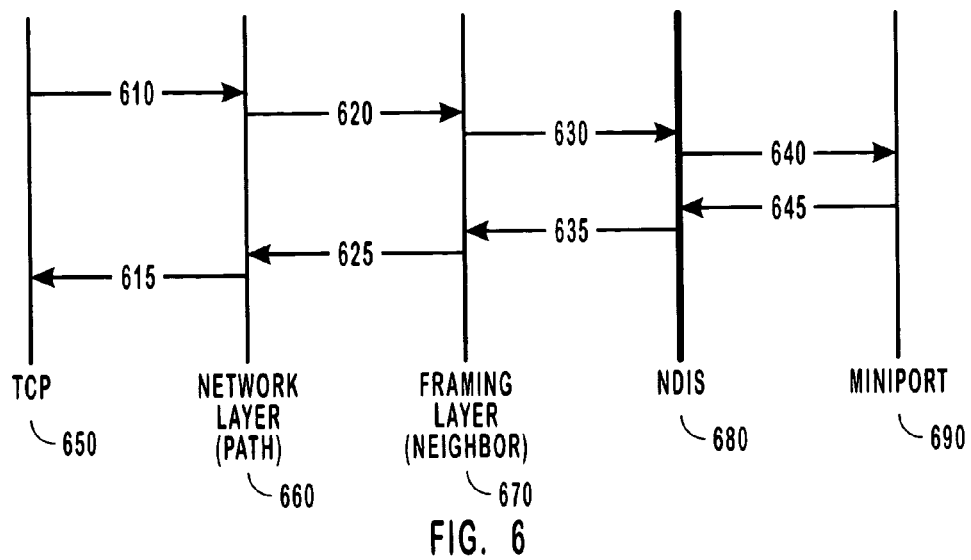
FIG. 6 shows a possible signal sequence between intermediate software layers in a network protocol stack for updating a cached state portion of a state object in accordance with the present invention.

Once the host has offloaded the connection(s) as indicated, one or more software layers may need to update changes in their respective state object(s). FIG. 6 illustrates a possible signal sequence in accordance with the present invention between intermediate software layers in a network protocol stack for updating a cached state portion of a state object in the present invention. As already noted, this is done when a software layer updates a peripheral device with changes in the layer's CACHED state variable. Updating the CACHED state variable of the state object allows the intermediate software layer and peripheral device state to be consistent.

Accordingly, FIG. 6 shows that, as each software layer updates its CACHED state variable with the peripheral device, each software layer sends an update signal down the network protocol stack until it reaches the miniport driver 690. For example, if the TCP layer 650 needs to update its CACHED state variable with the peripheral device, the TCP layer 650 sends a signal 610 to the Network Layer (Path) 660, which sends an update signal 620 to the Framing Layer (Neighbor) 670, which in turn sends an update signal 630 to the Network Driver Interface Specification (NDIS) 680, which sends a signal 640 to the Miniport driver 690. Once the CACHED state variable has been updated with the peripheral device, the Miniport driver 690 relays a signal 645 to NDIS 680, which continues the set of relays 635, 625, and 615 to the TCP layer signaling that the TCP CACHED state variable has been updated with the peripheral device.

Since the present invention uses the block list data structure, these series of updates and confirmation steps need only occur at the software layer that initially updated the CACHED state variable. That is, for example, if the Framing Layer (Neighbor) 670 needed to update its CACHED state variable portion of its state object with the NIC, only steps 630, 640, 645, and 635 would need to occur. The upper software layers of the network protocol stack, therefore, would not need to participate in the signal relay for updating the Framing Layer's CACHED state. This ability to update multiple connection state changes with the block list also enables a high degree of connection integrity for each of the offloaded network connections. In an alternative embodiment, the update communication can be allowed to occur directly between the software layer performing the update and the Miniport driver 690. However this requires a large number of call interfaces to the Miniport Driver 690, and is not as easily extensible as additional network protocol layers are added to the offload.

If the host CPU or peripheral device needs to terminate the offloaded connection or state object, the present invention proposes a similar sequence of signaling steps. As a preliminary matter, either the host or the Offload Target can terminate an offload. An intermediate protocol layer can also indirectly terminate an offloaded TCP connection by terminating the Path or Neighbor State Object that the TCP connection depended upon. This will eventually cause a TCP connection timeout, which will cause the Offload Target to request that the TCP connection offload be terminated. A connection offload may be terminated for a variety of reasons. In general, there will be an administrative mechanism to tell the protocol stack to offload specific connections. If an Offload Target requests termination of offload for a connection that the administrator directed to be offloaded, the host will grant the termination, and an event will be logged for the administrator.

Alternatively, if the network interface goes down (e.g., media disconnect event), the Offload Target should not request termination of offloaded State Objects. The host will be notified of the event through the normal signaling event and will decide on the best course of action. As well, if the connection is reset (this occurs when a TCP RST segment is received), the Offload Target will indicate to the host that the connection offload should be terminated. If the next-hop address changes, causing the Neighbor state object to be changed, the host stack will ensure that the new state object is created before the old state object is invalidated. This allows the Offload Target to be certain that if a Neighbor or Path state object is no longer valid, it is not because of a temporary race condition in Path and/or Neighbor state object updates from the host stack.

Figure 7:
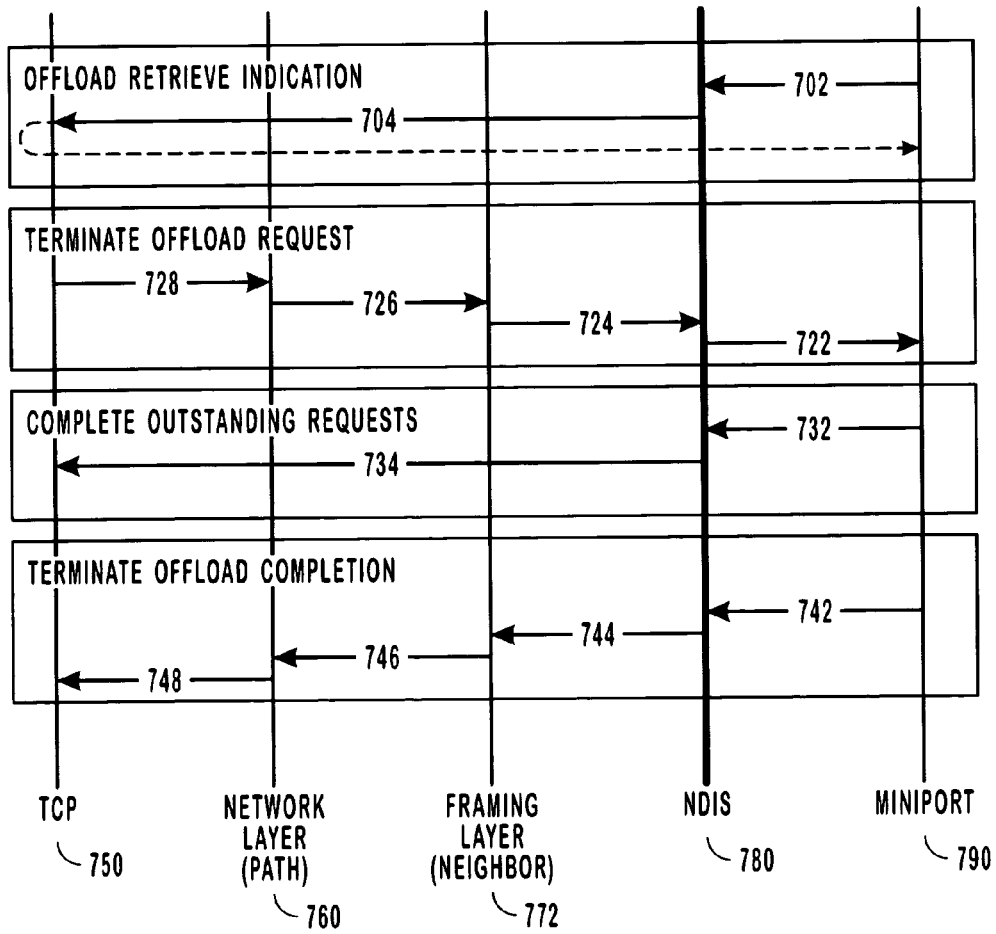
FIG. 7 is a possible signal sequence in accordance with the present invention between intermediate software layers in a network protocol stack wherein the peripheral device requests termination of an offloaded TCP connection.

FIG. 7 illustrates a possible signal sequence in accordance with the present invention between intermediate software layers in a network protocol stack wherein the peripheral device requests termination of an offloaded TCP connection. In the event a peripheral device decides to terminate an offload, the peripheral device requests the host stack to terminate the offload by calling an "indicate" function (as advertised by the host stack), and includes a reason the peripheral device wishes to terminate the offload. This reason may be a variety of reasons, including a situation where the peripheral device does not support a specific network protocol layer feature, such as it received urgent data and doesn't support it. The peripheral device termination request, for example, follows a series of signals (702, 704) through the protocol layers that begins with a call 702 from the Miniport driver 790 to NDIS 780, which in turn sends a termination request signal 704 to the TCP layer 750. If the host grants the peripheral device's termination request, the host confirms the request by sending a signal to the Miniport driver 790.

Once the host stack decides to terminate the offload, FIG. 7 illustrates that the host stack sends a signal through each of the intermediate software layers alerting the intermediate layers of the termination. For example, TCP 750 sends 728 a signal to the Network Layer 760 of the termination, the Network Layer sends 726 a signal to the Framing Layer 770 of the termination, and on down through the network protocol stack with signals 724 and 722. In the case of the highest layer (e.g. TCP) of the intermediate software layer, once the TCP Transport Layer 750 (i.e., Transport Layer 300) requests the termination, the TCP (or Transport) Layer will stop posting new application send or receive buffers to the Offload Target, and will start buffering any received TCP Segments until the peripheral device has successfully uploaded the network connection(s). By contrast, each lower software layer in the network protocol stack will check to see if the respective layer is the last dependent block list data structure for their it state object. If the respective intermediate layer has no more dependent blocks, then the respective layer will also request termination of their respective state object by adding an additional block list data structure to the list, and include an Offload Target handle for the intermediate layer's respective state object. If it does have additional dependent blocks, it will simply forward the upload request to the next layer without requesting upload of its state object. See signals 724 and 722.

When the Offload Target (e.g., the peripheral device) has confirmed the requested termination through the network protocol stack, the Offload Target ceases processing incoming network connection data, and brings the processing of the outgoing network connection data to a consistent state. With respect to outstanding requests (i.e., the application layer has posted network connection data buffers before confirming the offload termination), the Offload Target responds with a status signal (732, 734) back up through the network protocol stack that state, that a connection "upload" is "in progress". If there is any received network connection data for which the peripheral device has already acknowledged reception to the remote computer (i.e., a remote peer computer on the WAN), but the host's application has not yet posted a buffer to consume it (for eventual processing), then the peripheral device will package this posted buffer as part of the TCP DELEGATED state variable that it returns to the intermediate software layers.

In either case, the peripheral device returns control (e.g., signals 744, 746, 748) of each DELEGATED state variable (e.g., through NDIS 780) for each intermediate software level so that the host CPU regains control of the DELEGATED states. Thus, the Offload Target ensures that a consistent snapshot of the requested DELEGATED state from the various layers is made, fills the state into the state structures associated with the OffloadBlockList structures, and calls the terminate offload completion function (742). Again, because of the offloaded block list data structure, the connection termination call may be done for one or several connections at once.

One or more virtual device driver(s) may also be provided that manages one or more physical peripheral device drivers, such as one or more NIC drivers. The virtual device driver may expose a single Media Access Control (MAC) address to the host stack, and provide a mapping between the host stack and the one or more peripheral device drivers that the virtual driver manages. Or the virtual device driver may effectively provide multiple logical interfaces to the host stack for one (or more) physical peripheral devices, enabling the host stack to manage network traffic as if there are more networks than there are physical peripheral devices. Consequently, the peripheral device drivers are abstracted in such a way that the host stack sees one or more virtual device driver(s), and thus has no knowledge of the underlying one or more peripheral device drivers. Note that the virtual device driver may be separate from the physical device drivers or may be embedded within them.

The virtual peripheral device is enabled in the current invention by allowing it to participate in the peripheral initialization process, such that it can redirect all calls to the physical devices through itself, and potentially advertise greater or fewer virtual peripheral devices to the host stack than there are physical peripheral devices in the system.

During data transfer, for failover support within the team of peripheral devices, the virtual peripheral device can detect if a specific physical device has failed. There are a variety of mechanisms to support this, including detecting if the media sense has been lost, or by a constant heartbeat from the offloaded peripheral device to the network switch in the form of a signal repeated over fixed intervals. If the peripheral device detects that the heartbeat is lost (by, for example, no longer detecting the signal) the peripheral device driver signals this event to the virtual peripheral device.

The invention enables the virtual peripheral device to recover the offloaded state objects and attempt to move the network traffic to another peripheral device in the team. The virtual peripheral device can do this in a variety of ways, either by utilizing the host network stack to manage stack while the failover to another physical peripheral device occurs, or by halting new protocol offload requests and moving the state objects to the new physical peripheral device itself.

If the virtual peripheral device chooses to allow the host protocol stack to manage the offloaded state objects or connections (in the case of TCP) during the transition, the virtual peripheral device requests that the host protocol stack to cease offloading connections to the peripheral device and upload the existing state objects that the host has already offloaded to the peripheral device. Until the virtual peripheral device re-enables offload, the host processes the links or connections in its intermediate software layers.

The virtual device driver has knowledge of all available peripheral devices in a team of one or more peripheral devices. Once a peripheral device has failed, the virtual device driver then selects a new peripheral device that may be capable of receiving an offload of the connections or state objects. The virtual device driver detects what resources the new peripheral device may have, and initializes any state required in the peripheral device. Once the peripheral device has been initialized, the virtual device re-enables the offload of state objects.

When the host stack is re-enabled to offload to a specific virtual peripheral device, it re-queries the virtual peripheral for its offload capabilities. The host will use the new list of capabilities to select which state objects or connections can be offloaded. This may result in re-offloading the connections to the virtual peripheral (and consequently the new peripheral device) by transferring control of the inverted tree (i.e., by transferring the delegated, cached, and const state variables), depending on the new peripheral device capabilities that were advertised. Alternatively, if the new physical peripheral device does not support offload, the host will simply continue processing the connections itself through the intermediate software layers, rather than attempt to offload them.

Alternatively, the virtual peripheral device may choose to manage the transition of offloaded state objects between peripherals itself. If this is done the virtual peripheral device can still use the above described sequence of events to stall offload requests while it moves the state directly (rather than moving the offloaded state objects back to the host protocol stack), and advertise any changes in capabilities when the failover has completed.

Since the host maintains consistent state as offload capabilities vary, even though specific state objects or connections may be offloaded, and since the host may renegotiate parameters with a new peripheral device in the event of failover of an initial peripheral device, the present invention provides a novel, robust method of offloading and uploading one or more state objects or connections at once, regardless of peripheral device failure.

If the virtual peripheral device is configured to support multiple virtual LANs on one or more physical peripheral devices, the virtual peripheral device would again intercept the physical device initialization, and instead advertise one or more virtual peripheral devices to the host stack, and ensure that all calls made to a specific virtual adapter are mapped to the appropriate virtual LAN tag and physical peripheral device. During offload the Virtual ID is transferred in the initial offload request, either by adding to the Framing Layer state object or by creating a new state object for the virtual peripheral device. Specifically, the invention enables the virtual device to insert a structure into the BlockList structure, immediately under the Framing Layer structure in the BlockList, or to add to the Framing Layer BlockList state object the VID. The former approach also enables the virtual peripheral device to specify to the physical peripheral device opaque data (potentially vendor proprietary data). When the connection is uploaded, if an additional state object was added by the virtual peripheral device during offload, the virtual peripheral device removes the structure and hands the rest of the Block List to the host protocol stack.

The present invention may also be described in terms of methods, comprising functional steps, and/or non-functional acts. The following is a description of acts and steps that may be performed in practicing the present invention. Usually functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

Figure 8:
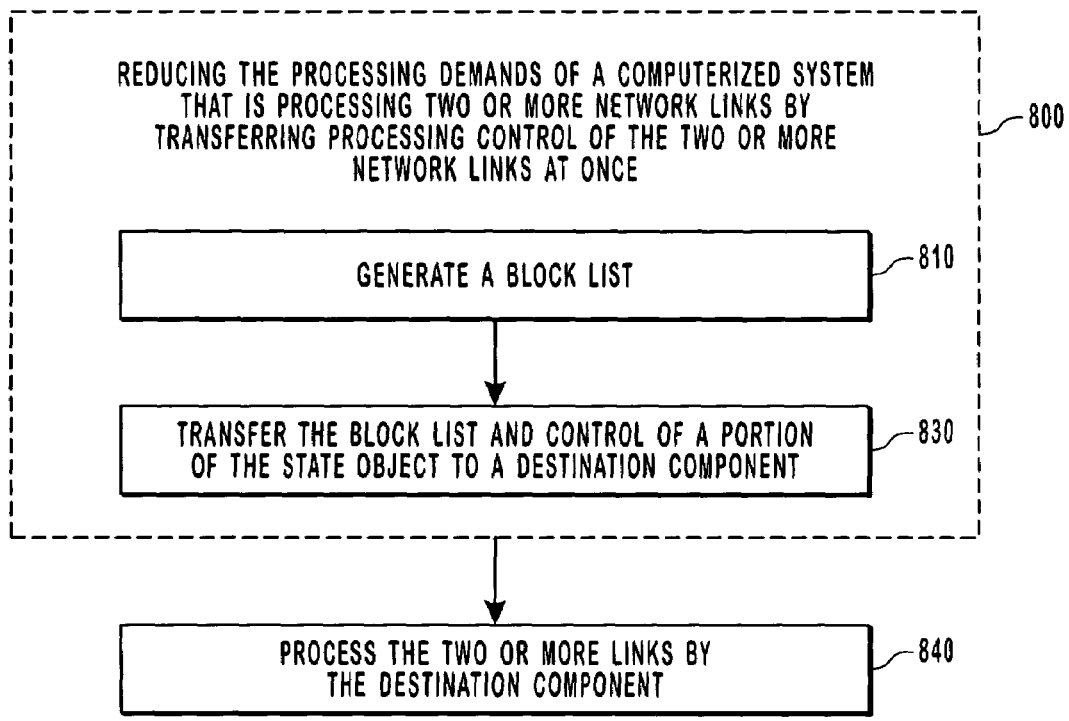
FIG. 8 is a flow chart for transferring processor control of multiple network connections from a source component to a destination component.

FIG. 8 illustrates a flow chart for implementing a method for transferring control between one or more destination component devices and one or more source component devices, the control needed to process a plurality of network connections in order to relieve the processing load of the source component while still maintaining integrity of the established network connections. FIG. 8 shows that this method for practicing the present invention includes the step 800 of reducing the processing demands of a computerized system that is processing two or more network connections by transferring processing control of two or more network connections at once. Ideally, this step 800 should be performed in a way that preserves the integrity for the two or more network connections with regard to state changes, failover events, and VLAN tags.

Step 800 may be accomplished by performing the specific act 810 of generating a block list. Act 810 can include generating a block list, the block list comprising a series of block pointers corresponding to sequential software layers for two or more network connection data paths over a network protocol stack. For example, the Act 810 may be performed by generating a Next block pointer that points to the same state layer in a different connection data path (e.g., a pointer 532 between two different Neighbor layer 530 states) through the network protocol stack, or may point to the same state layer (e.g., a pointer 547 between TCP 540 and TCP 545) within the same connection data path (e.g., 535) through the network protocol stack.

Step 800 also includes the specific act 830 of transferring the block list and control of a portion of the state object to a destination component. The portion of each software layer's state object may comprise one or more DELEGATED, CACHED, and CONST state variables. The host stack may then indicate to each software layer (e.g., by sending a control signal 330, 332, 334, 336) to send to a peripheral component (e.g., a peripheral device) the software layer's values for the CACHED, and CONST state variables, and that the layer will need to transfer control of the layer's DELEGATED state variable to the peripheral component.

The source component may then give the block list to the Offload Target (e.g., peripheral device, during offload, CPU during upload) during Chimney Offload or during Chimney Termination (or offload termination). In addition, the offload will not be complete until the source component has given control of at least the DELEGATED state variable for the offloaded software layers it is either offloading or uploading. Thus the offload (or upload) is completed for multiple connections from one or more inverted trees after the specific act of transferring the block list and the respective DELEGATED state variables from the source component to the destination component (and possibly CACHED AND CONST if the destination component does not already have them).

The method of FIG. 8 illustrates further that after performing step 800 (via acts 810, 820, and 830), the method comprises performing the specific act 840 of processing the two or more connections by the destination component. As inferred from the previous discussion, act 840 includes processing the two or more connections by the destination component after the transfer, wherein, if the block list and control of each state object data structure portion is transferred to the software layer, processing the connections in a central processing unit over the intermediate software layers, and if the block list and control of each state object portion is transferred to the peripheral device, processing the connection in the peripheral device.

For example, in the case of multiple connection upload, the peripheral device transfers back network processing control to the intermediate software layers to the CPU to be processed through the ordinary network protocol stack. In the case of multiple network connection offload, however, the CPU transfers network processing control to the peripheral device by transferring the block list and the respective CACHED, CONST, and DELEGATED states of the intermediate software layers to the peripheral device to be processed through a chimney. The present invention may be practiced both with long-lived and short-lived connections. With particular reference to short-lived connections, such as short-lived TCP connections, the CPU may offload each short-lived connection during the "slow-start" phase of the data transfer.

By way of explanation, when a remote computer makes, for example, a short-lived HTTP connection with a server, the server does not ordinarily respond to the remote computer's request by sending the requested data all at once. In most cases, the server transfers data slowly at first in order assess the connection bandwidth, and to avoid overflowing the remote computer or any other devices or links in the path. To make this assessment, the server will send the requested data to the remote computer iteratively in incrementing number of data packets. For example, the server may send a 500 byte packet, wait for an acknowledgment from the remote computer, then send two 500 byte packets (1000 byte packet), wait for an acknowledgment from the remote computer, and then five 500 byte packets, and so on until the server reaches a maximum data transfer rate with the remote computer.

Thus, if the remote computer has only a 28.8 Kbps (kilobits per second) dial-up connection, the server may ultimately transfer the data only at a certain rate (data packets per second), whereas if the remote computer has a 1000 Mbps (millions of bits per second) broadband connection, the server may ultimately transfer the data at a much higher rate. This incremental data send rate ("slow start") provides a certain time lag window that is typically greater than the time needed to transfer control of a short-lived connection between a CPU and peripheral device. Accordingly, in part since the present method provides for offloading multiple connections at once, the "slow-start" transfer window makes the present invention particularly suited to transferring processing control of both long and short-lived network connections, particularly when there are numerous connections to be offloaded.

Figure 9:
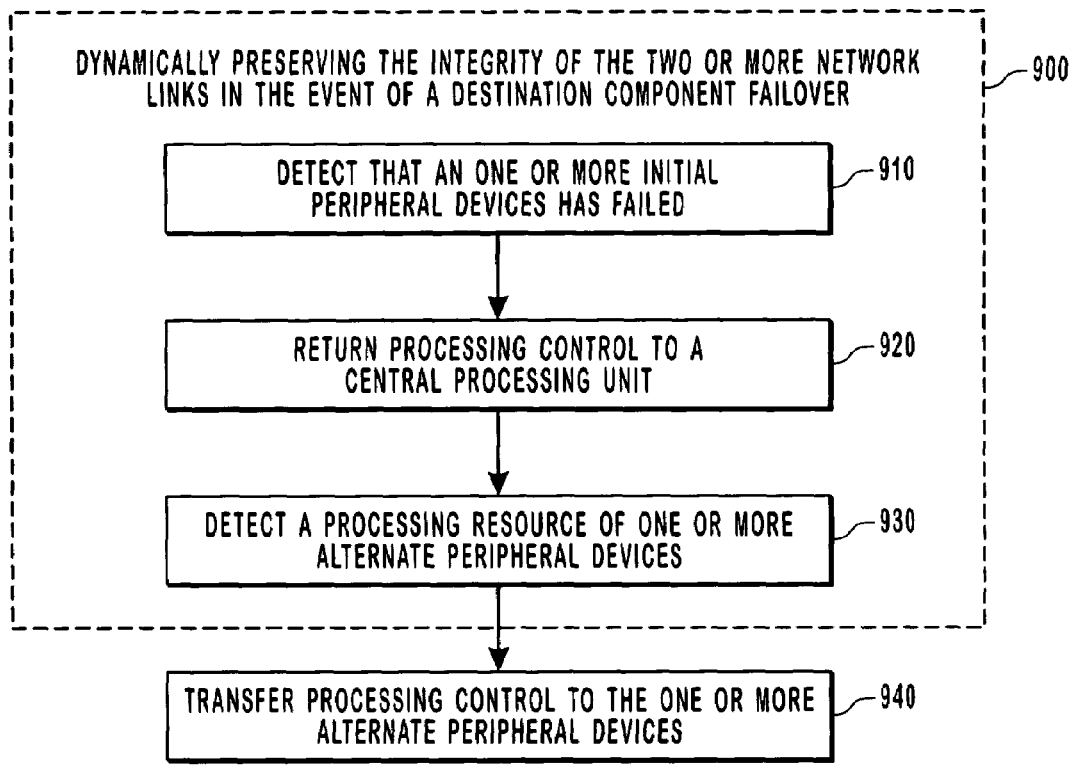
FIG. 9 is a flow chart for transferring control of multiple network connections from a failed peripheral device back to the host stack, and over to an alternate one or more destination peripheral devices.

FIG. 9 illustrates a flow chart for implementing a method for transferring a plurality of offloaded aggregated network links from one or more of the peripheral devices that has failed to another peripheral device that is capable of receiving the plurality of offloaded connections, while still maintaining integrity of each of the established, aggregated network links. FIG. 9 illustrates implementing this embodiment in accordance with the present invention by performing the functional step 900 of dynamically preserving the integrity of one or more aggregated network links in the event of a destination component failover. As noted, this step should be performed so that the one or more aggregated network links can be processed at one or more destination components that have not failed (i.e., alternate destination components). In addition, step 900 includes the specific act 910 of detecting that one or more initial peripheral devices have failed. Act 910 includes detecting that one or more initial peripheral devise with processing control of one or more aggregated network links have failed.

By way only of example and not limitation, network links may be "aggregated" (i.e., several links over several peripheral devices treated as one network link) such as in a "teamed NIC" environment (e.g., 802.3ad). A host CPU in accordance with the present invention may offload processing network processing tasks to the teamed peripheral devices by sending one or more block lists and one or more DELEGATED states from the intermediate software layers to the one or more initial peripheral devices. Since these aggregated links can be quite large, connection integrity may be of some importance to the CPU. Thus, the host CPU might need to detect when one or more of the peripheral devices is no longer capable of processing the offloaded network links.

To do so, in an embodiment where a NIC is the peripheral device, there may be a constant "pulse" from the offloaded peripheral device and the network on the link in the form of a signal repeated over fixed intervals. This pulse may be, for example, in the form of a continuous electrical signal between the NIC and a network device (e.g., a network router) that lets the NIC know that an aggregated link is still active. Thus, when the pulse stops, or the network device sends the pulse in the form of an error message of some sort, or the host administrator directs the components to fail over, the host recognizes that the NIC is no longer able to perform the offloaded tasks.

Step 900 also includes the specific act 920 of returning processing control to a central processing unit. Act 920 includes returning processing control of the one or more aggregated network links from the initial peripheral device to a central processing unit. For example, the NIC can request that the host CPU upload block lists and DELEGATED state variables, which were offloaded previously for multiple network links, in response to an error or failure signal (e.g., signals 702, 704, and 708). The NIC must then transfer the block list(s) and control of the respective DELEGATED state variables to the host CPU through the intermediate software layers in the network protocol stack.

Step 900 also includes the specific act 930 of detecting a processing resource of the different one or more alternate peripheral devices. Act 930 includes detecting the resource capabilities of one or more alternate peripheral devices that are capable of receiving the aggregated links. For example, one or more different NICs may have much greater or far fewer resource capabilities than the failover NICs, such that they have different data size processing capabilities, or slower/faster processors, etc. In addition, the connections may be of such a nature that only a few of the connections may be processed by the different NICs (i.e., the alternate one or more NICs do not support certain security parameters), or that the NIC can only handle processing a relatively small number of connections at once. Accordingly, the invention provides for negotiating parameters with the new one or more NICs by manipulating one or more of the block list(s), and the respective state object(s) so that the new one or more NICs can take the offloaded connections effectively. In one embodiment, the detection of failover events, and detection of new, capable peripheral devices to handle the transfer can be done by the virtual device driver as described herein, and as also described as the intermediate driver in FIG. 10. This ability to negotiate parameters with the different (new) one or more NICs allows for seamless failover support of multiple connection offloads.

FIG. 9 further illustrates implementing the inventive method by following functional step 900 with the specific act 940 of transferring network link processing control to the one or more alternate peripheral devices. Act 940 includes transferring processing control of the one or more aggregated network links to the one or more alternate peripheral devices. For example, after the host has negotiated parameters with the one or more new peripheral devices (e.g., NICs), the host stack can then transfer the respective block lists and control of the respective DELEGATED states for the appropriate one or more intermediate software layers. Once the host has transferred the block lists and DELEGATED states to the appropriate one or more alternate NICs, the one or more alternate NICs may then process the aggregated network links, and thereby relieve host of these network processing duties.

Figure 10:
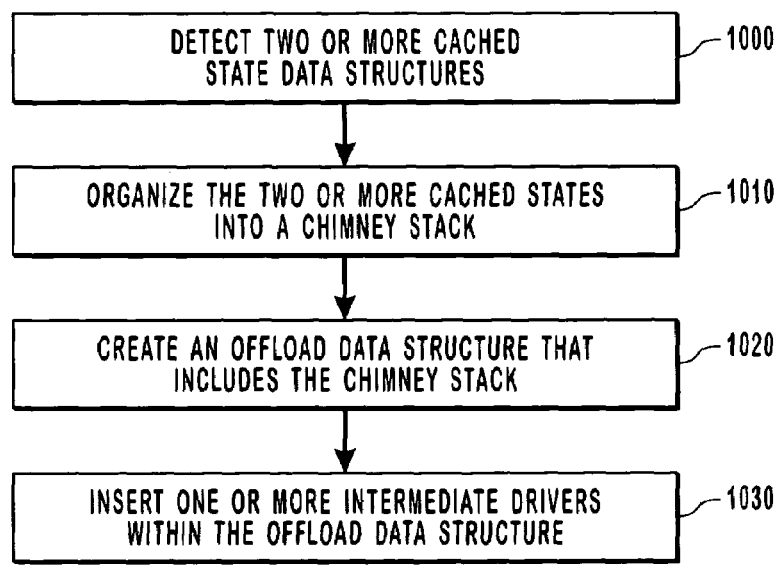
FIG. 10 is a flow chart for inserting an intermediate driver data structure within an offload data structure.

FIG. 10 illustrates a flow chart for implementing one embodiment in accordance with the present invention, wherein the invention performs a method of inserting an intermediate driver (such as a virtual peripheral device driver) adjacent an offload data structure in order to better facilitate, during a network connection offload and/or upload process, at least one of a virtual local area network and 802.3ad failover event. With specific reference to the flowchart, the inventive embodiment includes the specific act 1000 of detecting two or more CACHED state data structures. Act 1000 includes detecting two or more CACHED state data structures corresponding with two or more state objects of one or more intermediate software layers in a network protocol stack.

For example, an application layer may send an indicate signal (e.g., 330, 332, 334) to each network layer in a network protocol stack to determine the extent of each layer's state object, and what, if any, processes the layers may need to upload. Since the only state variable for which the host will grant processing control to the peripheral device is the CACHED state variable, the application layer will need to query each layer to see which layer's will offload a CACHED state variable. In the multiple connection case, at least two CACHED states variables will be detected in the same intermediate software layer of the network protocol stack.

The inventive method illustrated in FIG. 10 also includes the specific act 1010 of organizing the two or more CACHED states into a chimney stack. Act 1010 includes organizing the two or more CACHED state data structures sequentially into a chimney stack data structure, wherein offloading the chimney stack data structure to a peripheral device provides the peripheral device with processor control over the two or more CACHED state data structures. For example, after the software layers have indicated their CACHED state variables, the host process reads the CACHED states to the NIC in the correct processing order. In the case of a single network link, this sequence of states over the software layers may appear as a single branch (e.g. FIG. 4A) of the inverted tree described herein. In the case of multiple network links, the sequence of CACHED states combined with a block list that organizes several next and dependent block pointers may appear as an inverted tree of data structure blocks (e.g., FIG. 5B). In any case, the chimney comprises a single data structure that is offloaded to the NIC. As implied by name the chimney data structure is somewhat like a physical chimney in a building in the sense that data only enters at a single data interface, leaves at a different single interface, and has no outside interaction with other operators while it is being processed (or traveling), much like smoke traveling through a physical chimney.

In addition, the method illustrated in FIG. 10 further includes the specific act 1020 of creating an offload data structure that includes the chimney stack. For example, a chimney data structure (e.g., 308) may additionally be coupled with a chimney driver data structure, one or more Network Driver Interface Specification (NDIS) data structures, and a miniport driver data structure. The entire set of data structures may be combined as a composite offload data structure.

The inventive method of FIG. 10 also includes the specific act 1030 of inserting an intermediate driver within the offload data structure. For example, an intermediate driver may need to be inserted in the offload data structure to handle more specific needs among multiple or aggregated links. The intermediate driver could be generated by the host stack upon initiation of offload. In the case of 802.3ad aggregated links, an Intermediate driver (IM driver) could be inserted in the offload structure to coordinate resources and connections among two more "teamed" NICs. Alternatively, multiple intermediate drivers could be created to represent a single peripheral device, such as a single NIC, or a general purpose CPU, and then inserted into the offload data structure. In the case of virtual local area networks (VLANs), one or more IM drivers may need to translate VLAN tags attached to incoming data packets.

By way of explanation, a network administrator may wish only certain groups of an organization to see each other's documents, though all are on the same network. VLANs help accommodate this by tagging data such that only members of certain virtual networks may access each other's computer data. That is, on the same network, an administrator may organize several VLANs such that members of a "Research" VLAN cannot see the member's computers on the "Marketing" VLAN. VLANs can create special complications to offloading multiple long or short-lived connections since the offload stack may not be able to decipher VLAN data tags. This may be in part since an incoming data packet might contain multiple VLAN tags which must be deciphered before or after processing the network connection.

Accordingly, the invention provides for inserting one or more intermediate drivers (whether a single intermediate driver based on multiple peripheral devices, or multiple intermediate drivers based on a single peripheral device) in the offload data structure that can de-multiplex a data packet containing two or more VLAN tags, and process the data traffic appropriately. This VLAN functionality is generally allocated by the Framing Layer.

One will appreciate in view of the present application and claims, however, that the one or more intermediate drivers could also handle functions allocated by the Network Layer, such as securing data traffic through an IPSEC protocol. This can be in addition to the Framing Layer functions of allocating VLAN tags. For example, an intermediate driver can perform the functions of adding an authentication header on a data packet, or encapsulating the data packet, or both. This can be done regardless of, or in addition to, any additional VLAN tag management allocated through the Framing Layer. Accordingly, the present invention provides data structures and drivers that can be practiced in a wide variety of environments, including environments requiring secure links.

FIG. 11 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where local and remote processing devices perform tasks and are linked (either by hardwired links, wireless links, or by a combination of hardwired or wireless links) through a communications network. In a distributed computing environment, program modules may be located in both local and remote memory storage devices.

With reference to FIG. 11, an exemplary system for implementing the invention includes a general-purpose computing device in the form of a conventional computer 1110, including a processing unit 1120, a system memory 1130, and a system bus 1121 that couples various system components including the system memory 1130 to the processing unit 1120. The system bus 1121 may be any of several types of bus structures including a memory bus or memory controller, a peripheral bus, and a local bus using any of a variety of bus architectures. The system memory includes read only memory (ROM) 1124 and random access memory (RAM) 1125. A basic input/output system (BIOS) 1133, containing the basic routines that help transfer information between elements within the computer 1110, such as during start-up, may be stored in ROM 1124.

The computer 1110 may also include a magnetic hard disk drive 1141 for reading from and writing to a magnetic hard disk (not shown), a magnetic disk drive 1151 for reading from or writing to a removable magnetic disk 1129, and an optical disc drive 1155 for reading from or writing to removable optical disc 1131 such as a CD ROM or other optical media. The magnetic hard disk drive 1141, magnetic disk drive 1151, and optical disc drive 1155 are connected to the system bus 1121 by a non-removable non-volatile memory interface 1140, and a removable non-volatile memory interface 1150, respectively. The drives and their associated computer-readable media provide non-volatile storage of computer-executable instructions, data structures, program modules and other data for the computer 1110. Although the exemplary environment described herein employs a magnetic hard disk, a removable magnetic disk 1129 and a removable optical disc 1131, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk, magnetic disk 1129, optical disc 1131, ROM 1124 or RAM 1125, including an operating system 1134, one or more application programs 1135, other program modules 1136, and program data 1137. A user may enter commands and information into the computer 1110 through keyboard 1162, pointing device 1161, or other input devices (not shown), such as a microphone, joy stick, game pad, satellite dish, scanner, or the like. These and other input devices are often connected to the processing unit 1120 through an interface 1160 coupled to system bus 1121. Alternatively, the input devices may be connected by other interfaces, such as a parallel port, a game port or a universal serial bus (USB). A monitor 1191 or another display device is also connected to system bus 1121 via an interface, such as video adapter 1190. In addition to the monitor, personal computers typically include other peripheral output devices (not shown), such as speakers and printers.

The computer 1110 may operate in a networked environment using logical connections to one or more remote computers, such as remote computer 1180. Remote computer 1180 may be another personal computer, a server, a router, a network PC, a peer device or other common network node, and typically include many or all of the elements described above relative to the computer 1110, although only memory storage device 1181 and its associated application program 185 has been illustrated in FIG. 11. The logical connections depicted in FIG. 11 include a local area network (LAN) 1171 and a wide area network (WAN) 1172 that are presented here by way of example and not limitation. Such networking environments are commonplace in office-wide or enterprise-wide computer networks, intranets and the Internet.

When used in a LAN networking environment, the computer 1110 is connected to the local network 1171 through a network interface or adapter 1170. When used in a WAN networking environment, the computer 1110 may include a modem 1172, a wireless link, or other means for establishing communications over the wide area network 1173, such as the Internet. The modem 1172, which may be internal or external, is connected to the system bus 1121 via the serial port interface 1160. In a networked environment, program modules depicted relative to the computer 1110, or portions thereof, may be stored in the remote memory storage device. It will be appreciated that the network connections shown are exemplary and other means of establishing communications over wide area network 1173 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computerized system comprising a processor, a switching layer, and a sequence of one or more intermediate software layers of a network protocol stack, each of the intermediate software layers having a state object, a method for transferring control between one or more destination component devices and one or more source component devices, the control needed to process a plurality of network connections while still maintaining integrity of established network communication, the method comprising the following:

an act of generating an offload data structure, the offload data structure comprising a hierarchy of a plurality of state objects forming an inverted tree structure, the hierarchy corresponding to a plurality of network connections sharing a common path state object, the plurality of state objects corresponding to a network protocol state for one or more intermediate software layers;

an act of concurrently transferring from a source component device to a destination component device two or more state objects corresponding to the plurality of network connections in the same intermediate software layer of the offload data structure wherein one of the destination component and source component is a peripheral device;

an act of the destination component processing the two or more state objects at the same protocol layer after the transfer an act of detecting a failover event at one or more peripheral device, which includes:

an act of detecting that one or more links being processed at one or more corresponding peripheral devices have failed, the one or more failed peripheral devices having been given processor control of one or more offload data structures and one or more state objects; and an act of detecting a different one or more peripheral devices for handling processing control of the one or more links by receiving the one or more offload data structures and control of the one or more state objects.

2. The method of claim 1, wherein at least one of the two or more state objects includes a cached state variable, wherein the source component device maintains ownership of the cached state variable and the source component ensures that any changes to the cached state variable in the source component device is updated on the destination component device.

3. The method of claim 1, wherein the offload data structure further comprises a block list having at least a next block pointer that points to the same intermediate software layer of a different network connection path through the network protocol stack, and a dependent block pointer that points to a different hierarchal layer of the same network connection path through the network protocol stack.

4. The method of claim 1, wherein the act of transferring the offload data structure and the portion of the state object for each software layer is performed during the slow-start phase of a TCP connection.

5. The method of claim 1, further comprising an act of inserting an intermediate driver data structure in the offload data structure, the intermediate driver having programming to decipher and encapsulate deciphering and encapsulating incoming and outgoing data packets, as appropriate, wherein the outgoing data packets are packaged with one or more virtual local area network identifiers, and incoming packets are stripped of one or more virtual local area network identifiers.

6. The method of claim 5, wherein the intermediate driver includes programming for securing network traffic over one or more network links using an IPSEC protocol by performing one or more of adding and removing an authentication header to a data packet, and encrypting and decrypting the data packet, as appropriate.

7. The method of claim 1, further comprising:
an act of the peripheral device generating one or more handles for one or more intermediate software layers, wherein the peripheral device transfers the one or more handles to one or more corresponding host protocol stack layers; and
an act of, when at least one of the intermediate software layers changes cached state, the at least one of the intermediate software layers updating the cached state of the peripheral device.

8. The method of claim 1, wherein the one or more state objects comprise at least one of a delegated state or a cached state, the method further comprising transferring to the source component the one or more offload data structures and processing control of only the one or more state objects corresponding to a delegated state from the one or more failed peripheral devices wherein the cached states are not transferred to the source component, thereby uploading processing control of the one or more links from the one or more failed peripheral devices to the source component.

9. The method of claim 8, further comprising an act of detecting a processing resource of the different one or more peripheral devices; and adjusting the one or more state objects that have been uploaded from the one or more failed peripheral devices to match the detected resource of the different one or more peripheral devices, so that the one or more links can be processed at the different one or more peripheral devices rather than at the failed one or more peripheral devices.

10. The method of claim 9, wherein the one or more links are aggregated 802.3ad links.

11. The method of claim 1, further comprising:
an act of detecting a processing resource of the different one or more peripheral devices;
when one of the one or more offloaded state objects can be processed by the different one or more peripheral devices based on the detected processing resource, transferring processing control of the one of the one or more offloaded state objects to the different one or more peripheral devices; and
when the one or more offloaded state objects cannot be processed by the different one or more peripheral devices based on the detected processing resource, transferring processing control of the one of the one or more offloaded state objects to the host protocol stack.

12. The method of claim 11, wherein the one or more links are aggregated 802.3ad links.

13. The method of claim 1, wherein the plurality of state objects are of
a plurality of short-lived network connections, wherein the act of transferring comprises transferring two or more short-lived network connections in the same intermediate software layer of the offload data structure and wherein the act of processing comprises processing the two or more short-lived connections after the transfer.

14. The method of claim 13, wherein one of the destination component and source component is a peripheral device.

15. The method of claim 14, wherein a state object includes a cached state variable, and one or more of a constant state variable, and a delegated state variable.

16. The method of claim 14, wherein the offload data structure includes a block list having at least a next block pointer that points to the same intermediate software layer of a different connection path through the network protocol stack, and a dependent block pointer that points to a different hierarchal layer of the same connection path through the network protocol stack.

17. The method of claim 14, wherein the act of transferring the two or more short-lived connections is performed during the slow-start phase of a TCP connection.

18. The method of claim 14, further comprising an act of inserting an intermediate driver data structure in the offload data structure, the intermediate driver including programming for deciphering and encapsulating incoming and outgoing data packets, as appropriate, wherein the outgoing data packets are packaged with one or more virtual local area network identifiers and incoming packets are stripped of one or more virtual local area network identifiers.

19. The method of claim 18, wherein the intermediate driver includes programming for securing network traffic over one or more network links using an JIPSEC protocol by performing one or more of adding and removing an authentication header to a data packet, and encrypting and decrypting the data packet, as appropriate.

20. The method of claim 14, further comprising:
an act of generating a handle for each layer of the intermediate software layers, wherein the peripheral device transfers the handle for each intermediate software layer to each intermediate software layer; and
an act of, when at least one of the intermediate software layers changes cached state, the at least one of the intermediate software layers updating the cached state of the peripheral device.

21. The method of claim 14, further comprising:
an act of detecting that one or more links being processed at one or more corresponding peripheral devices have failed, the one or more failed peripheral devices having been given processor control of the two or more short-lived network connections; and
an act of detecting a different one or more peripheral devices for handling processing control of the one or more links by receiving the two or more short-lived network connections.

22. The method of claim 21, further comprising transferring to the source component the one or more offload data structures and processing control of the one or more state objects from the one or more failed peripheral devices, thereby uploading processing control of the one or more links from the one or more failed peripheral devices to the source component.

23. The method of claim 22, further comprising an act of detecting a processing resource of the different one or more peripheral devices; and adjusting the one or more state objects that have been uploaded from the one or more failed peripheral devices to match the detected resource of the different one or more peripheral devices, so that the one or more links can be processed at the different one or more peripheral devices rather than at the failed one or more peripheral devices.

24. The method of claim 23, wherein the one or more links are aggregated 802.3ad links.

25. The method of claim 21, further comprising:
an act of detecting a processing resource of the different one or more peripheral devices;
when one of the one or more offloaded state objects can be processed by the different one or more peripheral devices based on the detected processing resource, transferring processing control of the one of the one or more offloaded state objects to the different one or more peripheral devices; and
when the one or more offloaded state objects cannot be processed by the different one or more peripheral devices based on the detected processing resource, transferring processing control of the one of the one or more offloaded state objects to the host protocol stack.

26. The method of claim 25, wherein the one or more links are aggregated 802.3ad links.

27. The method of claim 1, wherein the computerized system further comprises a host processing unit, and wherein at least some of the intermediate software layers have a state object, and wherein the method further comprises:
an act of inserting one or more intermediate driver data structures within the offload data structure; and wherein transferring comprises transferring from the source component device to the peripheral device the two or more state objects.

28. The method of claim 27, wherein an intermediate driver corresponding with at least one of the one or more intermediate driver data structures performs the act of detecting that one or more links being processed at one or more corresponding peripheral devices have failed, and the act of detecting a different one or more peripheral devices for handling processing control of the one or more links, and wherein the intermediate drive data structures further perform: an act of detecting a processing resource of any of the detected one or more peripheral devices;
an act of detecting a processing resource of any of the detected one or more peripheral devices.

29. The method of claim 27, wherein the one or more intermediate driver data structures are inserted into the offload data structure prior to offloading processing control of the offload data structure to the one or more peripheral devices.

30. The method of claim 27, wherein the one or more intermediate driver data structures are inserted at the point of initiating an offload request of the offload data structure to the one or more peripheral devices.

31. The method of claim 30, wherein, at least one of the one or more intermediate drivers includes instructions for performing an act of directing the sub-data packet to a VLAN address based on a virtual LAN tag associated with the sub-data packet, the instructions further comprising and at least one of:
an act of receiving a multiplexed data packet;
an act of de-multiplexing the data packet into one or more sub-data packets;
an act of multiplexing a data packet; and
an act of sending a multiplexed data packet.

32. The method of claim 27, wherein, the offload data structure corresponds with two or more state objects corresponding to the same intermediate software layer, and wherein the two or more state objects point to a single state object at a lower software layer of a network protocol stack.

33. The method of claim 32, further comprising an act of transferring processing control of the entire inverted tree offload data structure to one or more of the one or more peripheral devices.

34. The method of claim 33, further comprising an act of transferring processing control of one or more of the state objects of the inverted tree offload data structure from the at least one of the one or more peripheral devices to the host protocol stack.

35. The method of claim 34, wherein the act of transferring from a source component device to one or more peripheral devices one or more state objects occurs in response to an act of detecting that at least one of the one or more peripheral devices has failed.

36. The method of claim 35, wherein an intermediate driver that corresponds with at least one of the one or more intermediate driver data structures performs the method comprising:
the act of detecting a different one or more peripheral devices that are for handling processing control of only the one or more links;
the act of detecting a different one or more peripheral devices that are for receiving processing control of the one or more links and one or more state objects; and
an act of detecting a processing resource of any of the detected one or more peripheral devices,
when the different one or more peripheral devices are capable of handling processing control of only the one or more links based on the detected processing resource, an act of transferring processing control of only the one or more links to the different one or more peripheral devices;
when the different one or more peripheral devices are capable of handling processing control of one or more links and one or more state objects based on the detected processing resource, an act of transferring processing control of the one or more links and the one or more offloaded state objects to the different one or more peripheral devices; and
an act of transferring processing control of any remaining of the one or more links and any remaining of the one or more offloaded state objects to the host protocol stack.

37. A computer program product comprising one or more computer-readable storage media storing computer-executable instructions that, when executed by one or more processors at the host computing system, cause the host computing system to perform the method recited in claim 1.

38. The computer program product of claim 37, wherein the computer-executable instructions, when executed by the one or more processors, further cause the computerized system to perform the following:
an act of generating a handle for each layer of the intermediate software layers, wherein the destination component is a NIC, and the NIC transfers the handle for each intermediate software layer to each intermediate software layer; and
an act of, when at least one of the intermediate software layers changes cached state, the at least one of the intermediate software layers updating the cached state of the NIC.

39. The computer program product of claim 37, wherein the computer-executable instructions, when executed by the one or more processors, further cause the computerized system to perform the following:

an act of detecting a processing resource of the different one or more peripheral devices;

when one of the one or more offloaded state objects can be processed by the different one or more peripheral devices based on the detected processing resource, transferring processing control of the one of the one or more offloaded state objects to the different one or more peripheral devices; and when the one or more offloaded state objects cannot be processed by the different one or more peripheral devices based on the detected processing resource, transferring processing control of the one of the one or more offloaded state objects to the host protocol stack.

* * * * *